United States Patent
Pitigoi-Aron et al.

(10) Patent No.: US 10,579,581 B2
(45) Date of Patent: Mar. 3, 2020

(54) MULTILANE HETEROGENEOUS SERIAL BUS

(71) Applicant: QUALCOMM Incorporated, San Diego, CA (US)

(72) Inventors: Radu Pitigoi-Aron, San Jose, CA (US); Richard Dominic Wietfeldt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/204,401

(22) Filed: Nov. 29, 2018

(65) Prior Publication Data

US 2019/0266122 A1 Aug. 29, 2019

Related U.S. Application Data

(60) Provisional application No. 62/636,804, filed on Feb. 28, 2018.

(51) Int. Cl.
*G06F 13/42* (2006.01)

(52) U.S. Cl.
CPC .. *G06F 13/4291* (2013.01); *G06F 2213/0016* (2013.01)

(58) Field of Classification Search
CPC .................................................. G06F 13/4291
USPC ........................................................ 710/110
See application file for complete search history.

(56) References Cited

U.S. PATENT DOCUMENTS

| | | | | |
|---|---|---|---|---|
| 6,011,751 A | * | 1/2000 | Hirabayashi | G11C 7/1018 365/189.15 |
| 6,233,635 B1 | * | 5/2001 | Son | G06F 13/4291 710/315 |
| 7,154,723 B1 | * | 12/2006 | Warnakulasooriya | G06F 1/206 361/62 |
| 7,676,622 B2 | * | 3/2010 | Naderi | G06F 13/387 710/305 |
| 2002/0176009 A1 | * | 11/2002 | Johnson | H04N 5/335 348/229.1 |
| 2008/0181206 A1 | * | 7/2008 | Konishi | G06F 13/126 370/360 |
| 2008/0313377 A1 | * | 12/2008 | Kawano | G09G 5/001 710/244 |

(Continued)

OTHER PUBLICATIONS

PCI Express Base Specification Revision 3.0 Nov. 10, 2010 (Year: 2010).*

(Continued)

*Primary Examiner* — Paul R. Myers
(74) *Attorney, Agent, or Firm* — Loza & Loza LLP

(57) ABSTRACT

Systems, methods, and apparatus are described that enable a serial bus to be operated in one or more modes that employ additional wires for communicating data. A method includes configuring a first interface to exchange data over two primary wires of a serial bus in accordance with a first I3C protocol, and configuring a second interface to communicate over at least one secondary wire in accordance with a second I3C protocol. In one example, the first data is encoded in a sequence of symbols representing signaling state of the two primary wires. A recovered clock signal may be derived from transitions between symbol transmission intervals in the first interface may be used to control double data rate communication through the second interface.

30 Claims, 28 Drawing Sheets

(56) References Cited

U.S. PATENT DOCUMENTS

| | | | | |
|---|---|---|---|---|
| 2009/0077294 | A1* | 3/2009 | Liu | G06F 13/385 |
| | | | | 710/301 |
| 2014/0098194 | A1* | 4/2014 | Goma | H04N 5/23212 |
| | | | | 348/47 |
| 2014/0149616 | A1* | 5/2014 | Chiang | G06F 13/4291 |
| | | | | 710/110 |
| 2014/0149617 | A1* | 5/2014 | Chiang | G06F 13/364 |
| | | | | 710/110 |
| 2014/0337553 | A1* | 11/2014 | Du | G06F 13/24 |
| | | | | 710/267 |
| 2015/0161075 | A1* | 6/2015 | Yoon | G06F 13/4291 |
| | | | | 710/110 |
| 2016/0004659 | A1* | 1/2016 | Otoshi | G06F 13/4022 |
| | | | | 710/310 |
| 2016/0195910 | A1* | 7/2016 | Sengoku | G06F 13/4291 |
| | | | | 710/313 |
| 2016/0217090 | A1* | 7/2016 | Sengoku | G06F 13/364 |
| 2016/0335213 | A1* | 11/2016 | Yang | G06F 13/4022 |
| 2017/0041688 | A1* | 2/2017 | Pitigoi-Aron | H04Q 9/00 |
| 2017/0075852 | A1* | 3/2017 | Mishra | G06F 13/4282 |
| 2017/0255588 | A1* | 9/2017 | Pitigoi-Aron | G06F 13/364 |
| 2017/0286358 | A1* | 10/2017 | Srivastava | G06F 13/4291 |
| 2018/0137079 | A1* | 5/2018 | Lee | G06F 13/4282 |
| 2018/0275990 | A1* | 9/2018 | Peixoto Machado Da Silva | |
| | | | | G06F 9/3005 |

OTHER PUBLICATIONS

The I2C-Bus Specification Version 2.1, Jan. 2000 (Year: 2000).*
Specification for I3C Improved Inter Integrated Circuit Version 1.0 Dec. 23, 2016 (Year: 2016).*

* cited by examiner

FIG. 20

| Rank base 7 | Base 7 value | Transitions i.e. Base 7 Coefficients | Total value | Hex | Base 7 Slots | Bits covered | Max Binary | Bits per base 7 | Data Channel usage |
|---|---|---|---|---|---|---|---|---|---|
| 0 | 1 | 6 | 6 | 6 | 1 | 2.584963 | 3 | 2 | 50.00% |
| 1 | 7 | 6 | 48 | 30 | 2 | 5.584963 | 31 | 2.5 | 64.58% |
| 2 | 49 | 6 | 342 | 156 | 3 | 8.417853 | 255 | 2.666667 | 74.56% |
| 3 | 343 | 6 | 2400 | 960 | 4 | 11.22882 | 3047 | 2.75 | 85.29% |
| 4 | 2401 | 6 | 16806 | 41A6 | 5 | 14.03669 | 16383 | 2.8 | 97.48% |
| 5 | 16807 | 6 | 117648 | 1CB90 | 6 | 16.84412 | 65535 | 2.666667 | 55.70% |
| 6 | 117649 | 6 | 823542 | C90F6 | 7 | 19.65148 | 524287 | 2.714286 | 63.66% |
| 7 | 823543 | 6 | 5764800 | 57F6C0 | 8 | 22.45884 | 4194303 | 2.75 | 72.76% |
| 8 | 5764801 | 6 | 40353606 | 267BF46 | 9 | 25.26619 | 33554431 | 2.777778 | 83.15% |
| 9 | 40353607 | 6 | 2.82E+08 | 10D63AF0 | 10 | 28.07355 | 268435455 | 2.8 | 95.03% |
| 10 | 2.82E+08 | 6 | 1.98E+09 | 75D89C96 | 11 | 30.8809 | 1073741823 | 2.727273 | 54.30% |
| 11 | 1.98E+09 | 6 | 1.38E+10 | 338914820 | 12 | 33.68826 | 8589934591 | 2.75 | 62.06% | ns
MULTILANE HETEROGENEOUS SERIAL BUS

PRIORITY CLAIM

This application claims priority to and the benefit of U.S. Provisional Patent Application Ser. No. 62/636,804 filed in the U.S. Patent Office on Feb. 28, 2018, the entire content of this application being incorporated herein by reference as if fully set forth below in its entirety and for all applicable purposes.

TECHNICAL FIELD

The present disclosure relates generally to an interface between processing circuits and peripheral devices and, more particularly, to expanding data communication throughput on a serial bus.

BACKGROUND

Mobile communication devices may include a variety of components including circuit boards, integrated circuit (IC) devices and/or System-on-Chip (SoC) devices. The components may include processing circuits, user interface components, storage and other peripheral components that communicate through a serial bus. The serial bus may be operated in accordance with a standardized or proprietary protocol.

In one example, the Inter-Integrated Circuit serial bus, which may also be referred to as the I2C bus or the I²C bus, is a serial single-ended computer bus that was intended for use in connecting low-speed peripherals to a processor. In some examples, a serial bus may employ a multi-master protocol in which one or more devices can serve as a master and a slave for different messages transmitted on the serial bus. Data can be serialized and transmitted over two bidirectional wires, which may carry a data signal, which may be carried on a Serial Data Line (SDA), and a clock signal, which may be carried on a Serial Clock Line (SCL).

In another example, Improved Inter-Integrated Circuit (I3C) protocols may be used to control a serial bus. I3C protocols derive certain implementation aspects from the I2C protocol, and are defined by the Mobile Industry Processor Interface Alliance (MIPI). Original implementations of I2C supported data signaling rates of up to 100 kilobits per second (100 kbps) in standard-mode operation, with more recent standards supporting speeds of 400 kbps in fast-mode operation, and 1 megabit per second (Mbps) in fast-mode plus operation.

As applications have become more complex, demand for throughput over the serial bus can escalate and capacity may be strained or exceeded.

SUMMARY

Certain aspects of the disclosure relate to systems, apparatus, methods and techniques that support bus width expansion on a dynamic basis. Certain aspects relate to serial bus including an I3C bus that may be operated in a single data rate (SDR) mode of operation, double data rate (DDR) mode of operation, and/or a ternary encoding mode of operation.

In various aspects of the disclosure, an apparatus adapted for data communication has a first interface coupled to two primary wires of a serial bus, a second interface coupled to a one or more secondary wires of the serial bus, and a controller. The controller may be configured to cause the first interface to exchange first data over the two primary wires in accordance with a first I3C protocol, and cause the second interface to exchange second data over at least one secondary wire in accordance with a second I3C protocol.

In one aspect, the first interface is configured to transmit the first data over the two primary wires in accordance with a double data rate protocol.

In one aspect, the second interface is configured to encode the second data in a plurality of symbols, and transmit the plurality of symbols over the at least two secondary wires. Each symbol may include bits that represent signaling state of at least two secondary wires during transmission of the symbol.

In one aspect, the first interface is configured to encode the first data in a sequence of symbols. Each symbol in the sequence of symbols may include bits that represent signaling state of the two primary wires.

In one aspect, the first interface is configured to decode the first data from a sequence of symbols received from the two primary wires. Each symbol in the sequence of symbols may include bits that represent signaling state of the two primary wires during a symbol transmission interval. The apparatus may have a clock recovery circuit configured to provide a recovered clock signal having an edge corresponding to each transition between symbol transmission intervals. The second interface may be further configured to use the recovered clock signal to receive the second data when the second data is encoded according to a double data rate protocol. The second interface may be further configured to use the recovered clock signal to transmit the second data over the at least one secondary wire in accordance with a double data rate protocol.

In one aspect, the second interface is configured to exchange the second data in accordance with a double data rate protocol. The second interface may be further configured to exchange the second data using at least two secondary wires. Each byte of the second data may be exchanged using the at least two secondary wires.

In various aspects of the disclosure, a method includes configuring a first interface to exchange data over two primary wires of a serial bus in accordance with a first I3C protocol, and configuring a second interface to communicate over at least one secondary wire in accordance with a second I3C protocol. In one example, the first data may be transmitted over the two primary wires in accordance with a double data rate protocol. In another example, the first data may be encoded in a sequence of symbols, each symbol in the sequence of symbols including bits that represent signaling state of the two primary wires. In another example, the first data may be decoded from a sequence of symbols, each symbol in the sequence of symbols including bits that represent signaling state of the two primary wires. A recovered clock signal may be derived from transitions between symbol transmission intervals in the first interface may be used to control double data rate communication through the second interface.

In various aspects of the disclosure, a processor-readable storage medium includes code for configuring a first interface to exchange data over two primary wires of a serial bus in accordance with a first I3C protocol, configuring a second interface to exchange second data over at least one secondary wire in accordance with a second I3C protocol. In one example, the first data may be transmitted over the two primary wires in accordance with a double data rate protocol. In another example, the first data may be encoded in a sequence of symbols, each symbol in the sequence of symbols including bits that represent signaling state of the two primary wires. In another example, the first data may be decoded from a sequence of symbols, each symbol in the sequence of symbols including bits that represent signaling state of the two primary wires. A recovered clock signal may be derived from transitions between symbol transmission intervals in the first interface may be used to control double data rate communication through the second interface.

BRIEF DESCRIPTION OF THE DRAWINGS

FIG. 20 illustrates various coding modes for different numbers of slots available for transmitting symbols in accordance with certain aspects disclosed herein.

DETAILED DESCRIPTION

Figure 1:
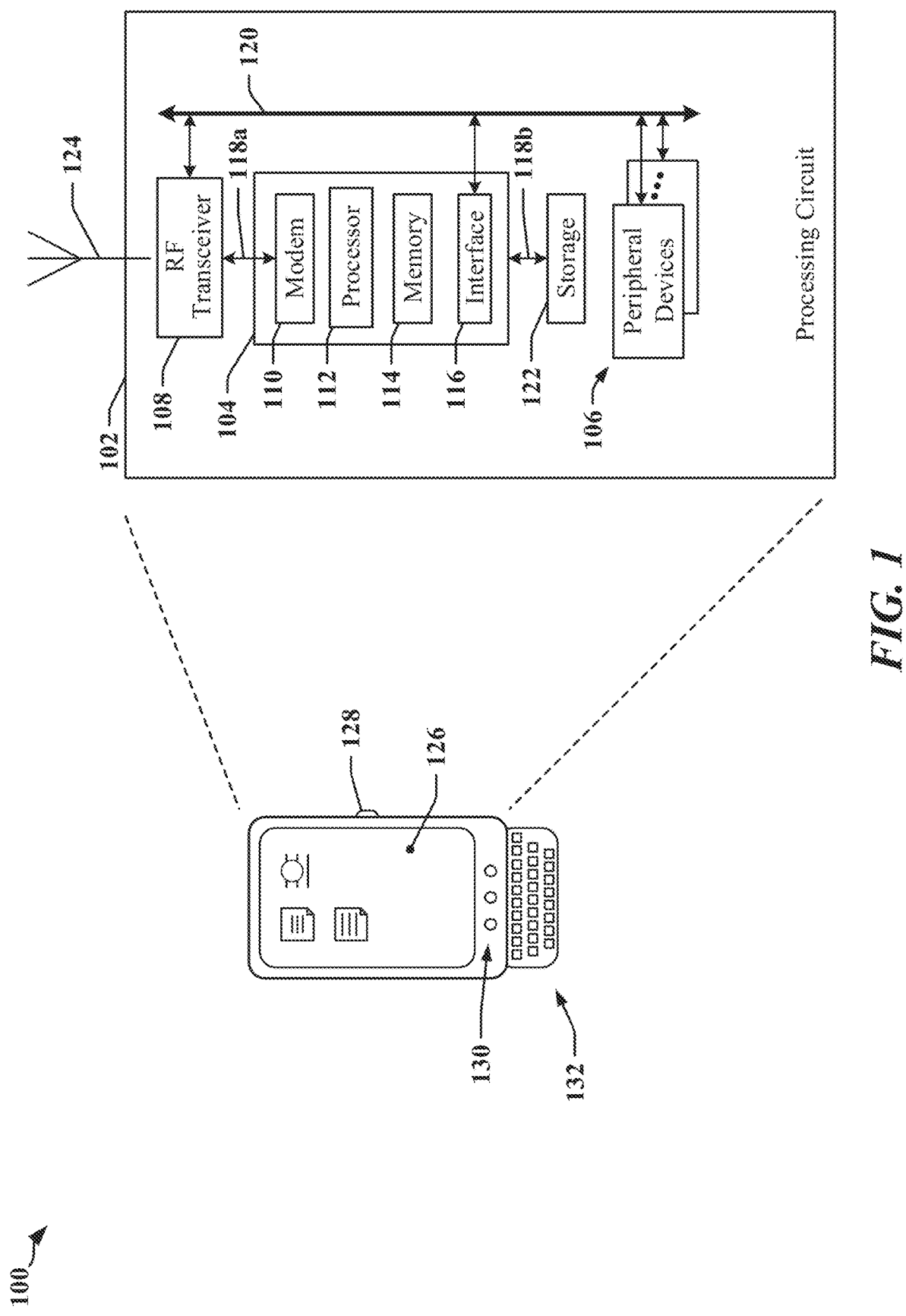
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include multiple SoC and other IC devices often employ a serial bus to connect application processor or other host device with modems and other peripherals. The serial bus may be operated in accordance with specifications and protocols defined by a standards body. The serial bus may be operated in accordance with a standard or protocol such as the I2C, I3C, serial low-power inter-chip media bus (SLIMbus), system management bus (SMB), radio frequency front-end (RFFE) protocols that define timing relationships between signals and transmissions. Certain aspects disclosed herein relate to systems, apparatus, methods and techniques that provide a mechanism that can be used on an I3C bus to dynamically extend the bus width and thereby improve bandwidth and/or throughput. When the bus width is extended, error detection schemes may be employed that improve link reliability.

For example, an apparatus has a first interface configurable to communicate data over two primary wires of a serial bus in accordance with an I3C protocol, a second interface configurable to communicate over a plurality of secondary wires of the serial bus using phase-differential signaling, and a controller configured to configure the first interface to operate according to a first I3C protocol, and configure the second interface to encode data in a plurality of symbols configured based on characteristics of the first I3C protocol and number of wires in the plurality of secondary wires.

Example of an Apparatus with a Serial Data Link

According to certain aspects, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that may employ a data communication bus. The apparatus 100 may include an SoC a processing circuit 102 having multiple circuits or devices 104, 106 and/or 108, which may be implemented in one or more ASICs or in an SoC. In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, external keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
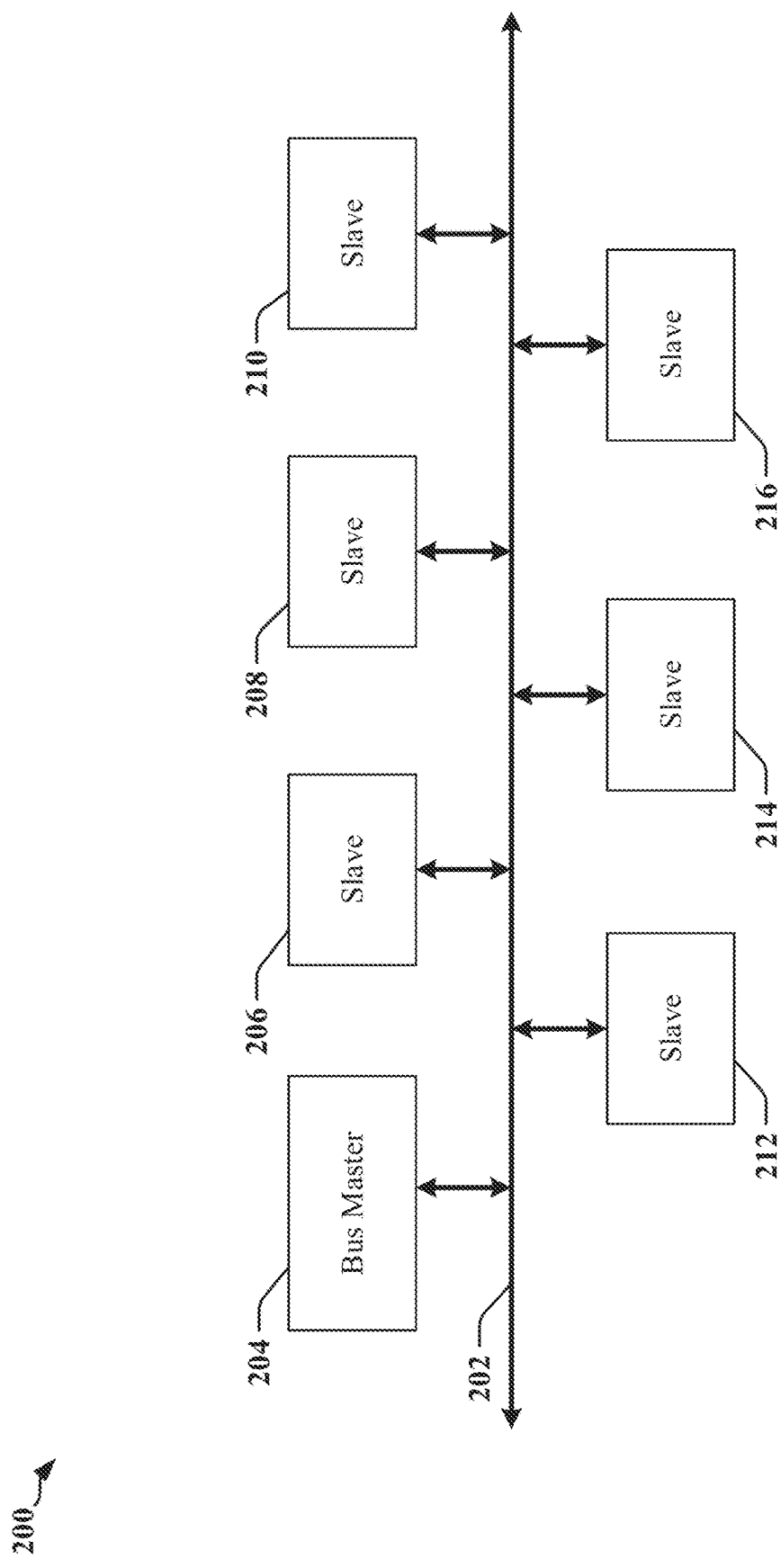
FIG. 2 illustrates a communication interface in which a plurality of devices is connected using a serial bus.

FIG. 2 illustrates a communication link 200 in which a configuration of devices 204, 206, 208, 210, 212, 214 and 216 are connected using a serial bus 202. In one example, the devices 204, 206, 208, 210, 212, 214 and 216 may be adapted or configured to communicate over the serial bus 202 in accordance with an I3C protocol. In some instances, one or more of the devices 204, 206, 208, 210, 212, 214 and 216 may alternatively or additionally communicate using other protocols, including an I2C protocol, for example.

Communication over the serial bus 202 may be controlled by a master device 204. In one mode of operation, the master device 204 may be configured to provide a clock signal that controls timing of a data signal. In another mode of operation, two or more of the devices 204, 206, 208, 210, 212, 214 and 216 may be configured to exchange data encoded in symbols, where timing information is embedded in the transmission of the symbols.

Figure 3:
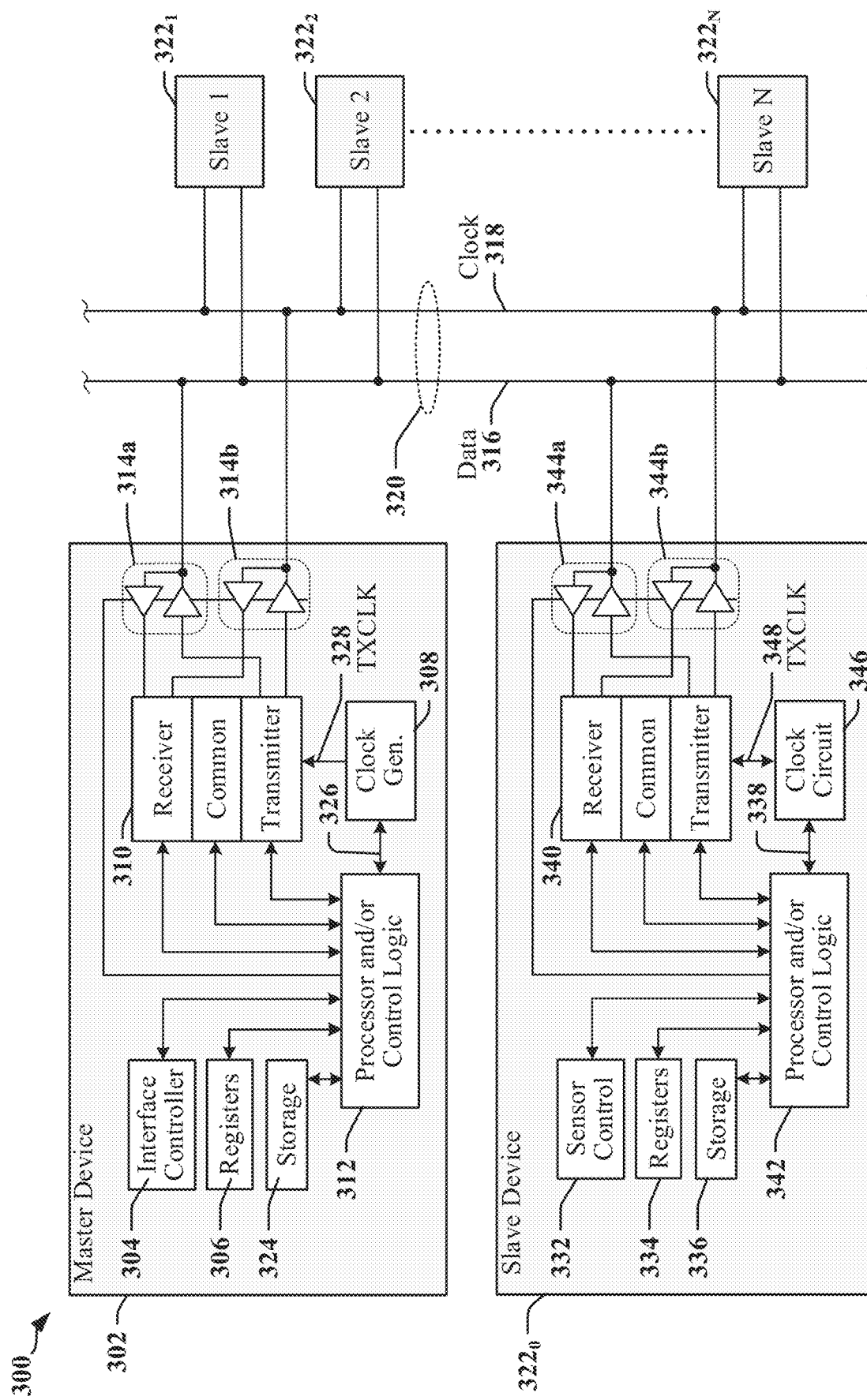
FIG. 3 illustrates certain aspects of an apparatus that includes multiple devices connected to a serial bus.

FIG. 3 illustrates certain aspects of an apparatus 300 that includes multiple devices 302, and $322_0$-$322_N$ coupled to a serial bus 320. The devices 302 and $322_0$-$322_N$ may be implemented in one or more semiconductor IC devices, such as an applications processor, SoC or ASIC. In various implementations the devices 302 and $322_0$-$322_N$ may include, support or operate as a modem, a signal processing device, a display driver, a camera, a user interface, a sensor, a sensor controller, a media player, a transceiver, and/or other such components or devices. In some examples, one or more of the slave devices $322_0$-$322_N$ may be used to control, manage or monitor a sensor device. Communications between devices 302 and $322_0$-$322_N$ over the serial bus 320 is controlled by a bus master device 302. Certain types of bus can support multiple bus master devices 302.

In one example, a bus master device 302 may include an interface controller 304 that may manage access to the serial bus, configure dynamic addresses for slave devices $322_0$-$322_N$ and/or generate a clock signal 328 to be transmitted on a clock line 318 of the serial bus 320. The bus master device 302 may include configuration registers 306 or other storage 324, and other control logic 312 configured to handle protocols and/or higher-level functions. The control logic 312 may include a processing circuit such as a state machine, sequencer, signal processor or general-purpose processor. The bus master device 302 includes a transceiver 310 and line drivers/receivers 314a and 314b. The transceiver 310 may include receiver, transmitter and common circuits, where the common circuits may include timing, logic and storage circuits and/or devices. In one example, the transmitter encodes and transmits data based on timing in the clock signal 328 provided by a clock generation circuit 308. Other timing clocks 326 may be used by the control logic 312 and other functions, circuits or modules.

At least one device $322_0$-$322_N$ may be configured to operate as a slave device on the serial bus 320 and may include circuits and modules that support a display, an image sensor, and/or circuits and modules that control and communicate with one or more sensors that measure environmental conditions. In one example, a slave device $322_0$ configured to operate as a slave device may provide a control function, module or circuit 332 that includes circuits and modules to support a display, an image sensor, and/or circuits and modules that control and communicate with one or more sensors that measure environmental conditions. The slave device $322_0$ may include configuration registers 334 or other storage 336, control logic 342, a transceiver 340 and line drivers/receivers 344a and 344b. The control logic 342 may include a processing circuit such as a state machine, sequencer, signal processor or general-purpose processor. The transceiver 310 may include receiver, transmitter and common circuits, where the common circuits may include timing, logic and storage circuits and/or devices. In one example, the transmitter encodes and transmits data based on timing in a clock signal 348 provided by clock generation and/or recovery circuits 346. The clock signal 348 may be derived from a signal received from the clock line 318. Other timing clocks 338 may be used by the control logic 342 and other functions, circuits or modules.

The serial bus 320 may be operated in accordance with RFFE, I2C, I3C, SPMI, or other protocols. At least one device 302, $322_0$-$322_N$ may be configured to operate as a master device and a slave device on the serial bus 320. Two or more devices 302, $322_0$-$322_N$ may be configured to operate as a master device on the serial bus 320.

In some implementations, the serial bus 320 may be operated in accordance with an I3C protocol. Devices that communicate using the I3C protocol can coexist on the same serial bus 320 with devices that communicate using I2C protocols. The I3C protocols may support different communication modes, including a single data rate (SDR) mode that is compatible with I2C protocols. High-data-rate (HDR) modes may provide a data transfer rate between 6 megabits per second (Mbps) and 16 Mbps, and some HDR modes may be provide higher data transfer rates. I2C protocols may conform to de facto I2C standards providing for data rates that may range between 100 kilobits per second (kbps) and 3.2 Mbps. I2C and I3C protocols may define electrical and timing aspects for signals transmitted on the 2-wire serial bus 320, in addition to data formats and aspects of bus control. In some aspects, the I2C and I3C protocols may define direct current (DC) characteristics affecting certain signal levels associated with the serial bus 320, and/or alternating current (AC) characteristics affecting certain timing aspects of signals transmitted on the serial bus 320. In some examples, a 2-wire serial bus 320 transmits data on a data line 316 and a clock signal on the clock line 318. In some instances, data may be encoded in the signaling state, or transitions in signaling state of the data line 316 and the clock line 318.

High-Speed Data Transfers Over an I3C Serial Bus

Figure 4:
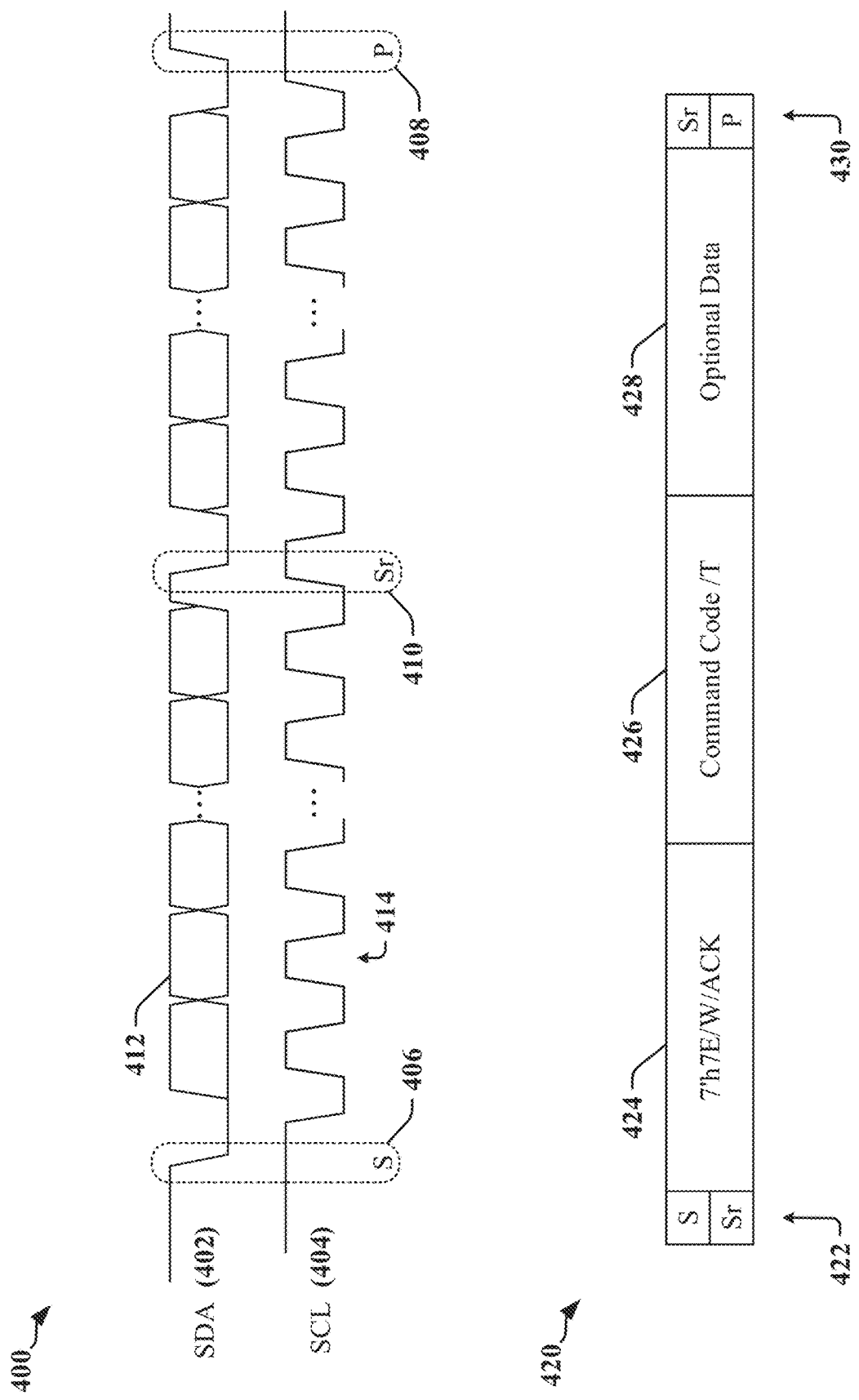
FIG. 4 includes a timing diagram that illustrates signaling on a serial bus when the serial bus is operated in a single data rate (SDR) mode of operation defined by I3C specifications.

FIG. 4 includes a timing diagram 400 that illustrates signaling on a serial bus when the serial bus is operated in a single data rate (SDR) mode of operation defined by I3C specifications. Data transmitted on a first wire (the Data wire 402) of the serial bus may be captured using a clock signal transmitted on a second wire (the Clock wire 404) of the serial bus. During data transmission, the signaling state 412 of the Data wire 4 is expected to remain constant for the duration of the pulses 414 when the Clock wire 404 is at a high voltage level. Transitions on the Data wire 402 when the Clock wire 404 is at the high voltage level indicate a START condition 406, a STOP condition 408 or a repeated START 410.

On an I3C serial bus, a START condition 406 is defined to permit the current bus master to signal that data is to be transmitted. The START condition 406 occurs when the Data wire 402 transitions from high to low while the Clock wire 404 is high. The bus master may signal completion and/or termination of a transmission using a STOP condition 408. The STOP condition 408 is indicated when the Data wire 402 transitions from low to high while the Clock wire 404 is high. A repeated START 410 may be transmitted by a bus master that wishes to initiate a second transmission upon completion of a first transmission. The repeated START 410 is transmitted instead of a STOP condition 408, and has the significance of a STOP condition 408 followed immediately by a START condition 406. The repeated START 410 occurs when the Data wire 402 transitions from high to low while the Clock wire 404 is high.

The bus master may transmit an initiator 422 that may be a START condition 406 or a repeated START 410 prior to transmitting an address of a slave, a command, and/or data. FIG. 4 illustrates a command code transmission 420 by the bus master. The initiator 422 may be followed in transmission by a predefined command 424 indicating that a command code 426 is to follow. The command code 426 may, for example, cause the serial bus to transition to a desired mode of operation. In some instances, data 428 may be transmitted. The command code transmission 420 may be followed by a terminator 430 that may be a STOP condition 408 or a repeated START 410.

Figure 5:
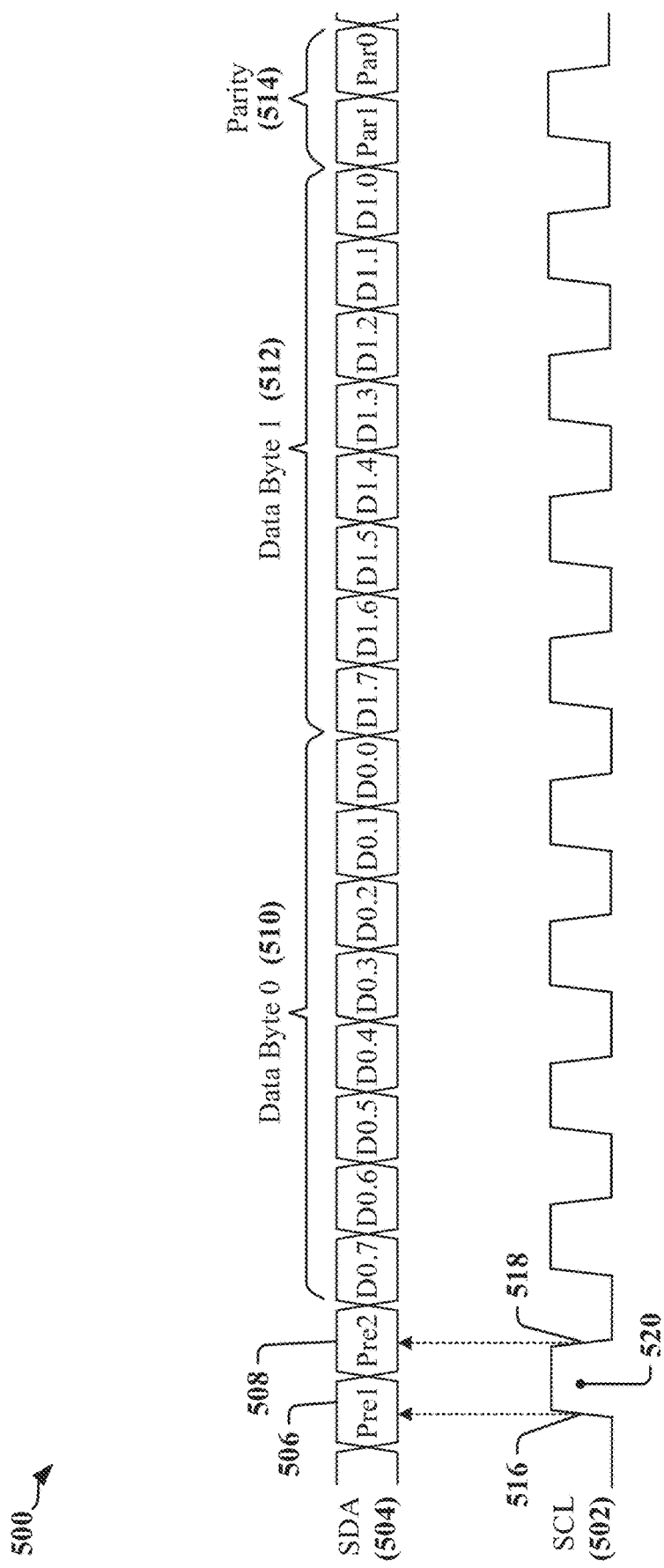
FIG. 5 is a timing diagram 500 that illustrates an example of a transmission in an I3C high data rate mode, where data is transmitted at double data rate.

Certain serial bus interfaces support signaling schemes that provide higher data rates. In one example, I3C specifications define multiple high data rate (HDR) modes, including a high data rate, double data rate (HDR-DDR) mode in which data is transferred at both the rising edge and the falling edge of the clock signal. FIG. 5 is a timing diagram 500 that illustrates an example of a transmission in an I3C HDR-DDR mode, in which data transmitted on the Data wire 504 is synchronized to a clock signal transmitted on the Clock wire 502. The clock signal includes pulses 520 that are defined by a rising edge 516 and a falling edge. A master device transmits the clock signal on the Clock wire 502, regardless of the direction of flow of data over the serial bus. A transmitter outputs one bit of data at each edge 516, 518 of the clock signal. A receiver captures one bit of data based on the timing of each edge 516, 518 of the clock signal.

Certain other characteristics of an I3C HDR-DDR mode transmission are illustrated in the timing diagram 500 of FIG. 5. According to certain I3C specifications, data transferred in HDR-DDR mode is organized in words. A word generally includes 16 payload bits, organized as two 8-bit bytes 510, 512, preceded by two preamble bits 506, 508 and followed by two parity bits 514, for a total of 20 bits that are transferred on the edges of 10 clock pulses. The integrity of the transmission may be protected by the transmission of the parity bits 514.

Figure 6:
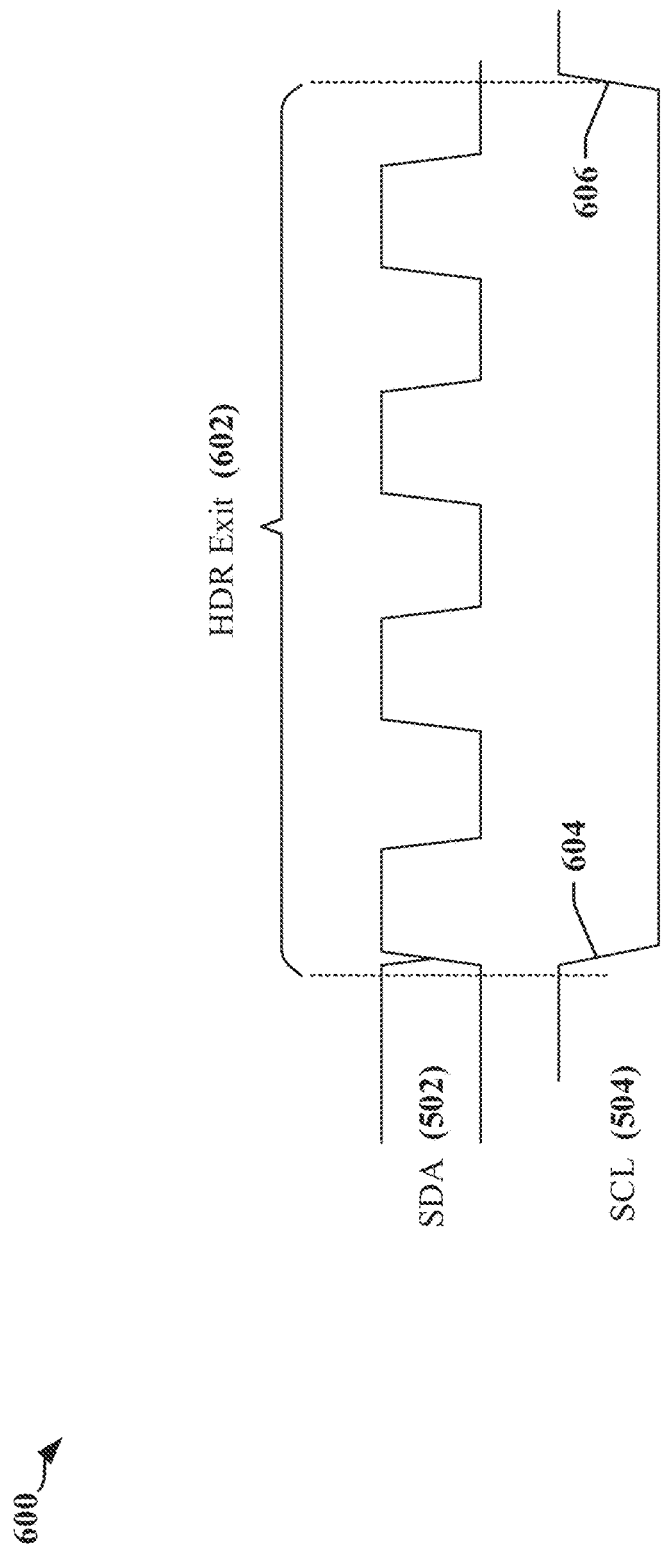
FIG. 6 illustrates an example of signaling transmitted on the Data wire and Clock wire of a serial bus to initiate certain mode changes.

FIG. 6 illustrates an example of signaling 600 transmitted on the Data wire 504 and Clock wire 502 to initiate certain mode changes. The signaling 600 is defined by I3C protocols for use in initiating restart, exit and/or break from I3C HDR modes of communication. The signaling 600 includes an HDR Exit 602 that may be used to cause an HDR break or exit. The HDR Exit 602 commences with a falling edge 604 on the Clock wire 502 and ends with a rising edge 606 on the Clock wire 502. While the Clock wire 502 is in low signaling state, four pulses are transmitted on the Data wire 504. I2C devices ignore the Data wire 504 when no pulses are provided on the Clock wire 502.

In another HDR mode, I3C specifications define a ternary encoding scheme in which transmission of a clock signal is suspended and data is encoded in symbols that define signals that are transmitted over the clock and data lines. Clock information is encoded by ensuring that a transition in signaling state occurs at each transition between two consecutive symbols.

Figure 7:
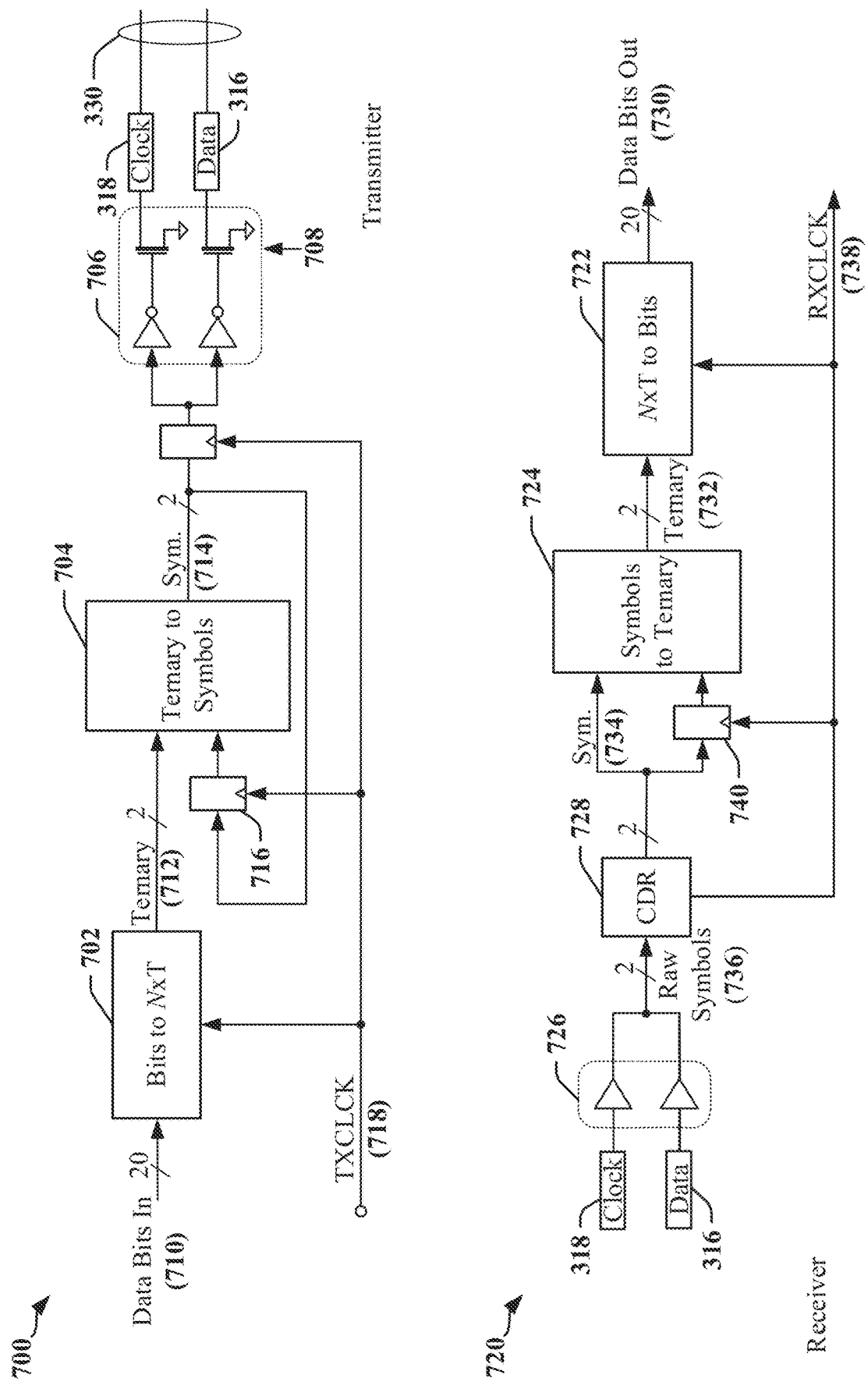
FIG. 7 illustrates certain aspects of a transmitter and a receiver according to certain aspects disclosed herein.

FIG. 7 is a block diagram illustrating an example of a transmitter 700 and a receiver 720 configured according to certain aspects disclosed herein. The example relates to a two-wire serial bus 330 (see FIG. 3). For HDR ternary modes of operation, the transmitter 700 may transcode data 710 into ternary (base-3) numbers that are encoded as symbols transmitted on a pair of connectors, wires or line such as the Clock line 318 and Data line 316. In the example depicted, each data element (also referred to as a data word) of the input data 710 may have a predefined number of bits, such as 8, 12, 16, 19 or 20 bits. A transcoder 702 may receive the input data 710 and produce a sequence of ternary numbers 712 for each data element. Each ternary number in the sequence of ternary numbers 712 may be encoded in two bits and there may be 12 ternary numbers in each sequence of ternary numbers 712. A ternary-to-symbols encoder 704 produces a stream of 2-bit symbols 714 that are transmitted through line drivers 706. In the example depicted, the line drivers 706 include open-drain output transistors 708. However, in other examples, the line drivers 706 may drive the Clock line 318 and Data line 316 using push-pull drivers. The output stream of 2-bit symbols 714 generated by the encoder has a transition in the state of at least one of the Clock line 318 and Data line 316 between consecutive symbols 714 by ensuring that no pair of consecutive symbols includes two identical symbols. The availability of a transition of state in at least one line 316, 318 permits a receiver 720 to extract a receive clock 738 from the stream of symbols 714.

In a high data rate interface, the receiver 720 may include or cooperate with a clock and data recovery (CDR) circuit 728. The receiver 720 may include line interface circuits 726 that provide a stream of raw 2-bit symbols 736 to the CDR circuit 728. The CDR circuit 728 extracts a receive clock 738 from the raw symbols 736 and provides a stream of 2-bit symbols 734 and the receive clock 738 to other circuits 724 and 722 of the receiver 720. In some examples, the CDR circuit 728 may produce multiple clocks 738. A symbols-to-ternary decoder 724 may use the receive clock 738 to decode the stream of symbols 734 into sequences of 12 ternary numbers 732. The ternary numbers 732 may be encoded using two bits. A transcoder 722 may then convert each sequence of 12 ternary numbers 732 into 8, 12, 16, 19 or 20-bit output data elements 730.

Figure 8:
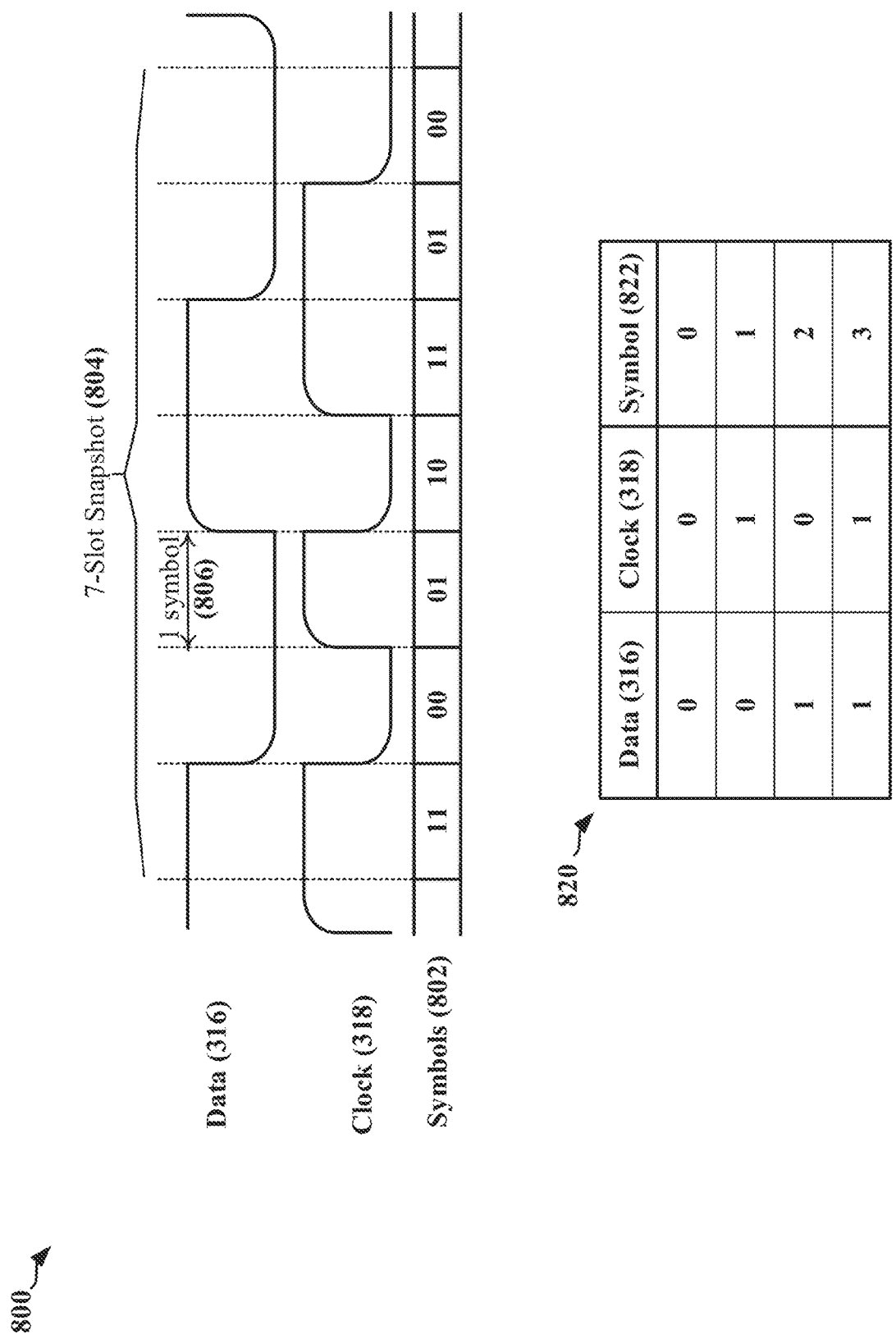
FIG. 8 illustrates the signaling state of a high data rate protocol, such as an I3C protocol, when transmitting symbols according to certain aspects disclosed herein.

FIG. 8 includes a timing diagram 800 illustrating the signaling state of the serial bus 330 when transmitting a sequence of symbols according to certain aspects disclosed herein. In the example depicted, both the Clock line 318 and Data line 316 are used to encode data. Raw symbol values 802 cause line driving circuits to drive each of the Clock line 318 and Data line 316 to voltage levels determined by one bit of the current raw symbol value 802. In the example, a symbol bit that is set to "binary 1" causes a corresponding one of the Clock line 318 and Data line 316 to a more positive voltage level, while a symbol bit that is set to "binary 0" causes a corresponding one of the Clock line 318 and Data line 316 to a more negative voltage level. FIG. 8 provides a table 820 showing the four possible signaling states for symbols 822 when each of the Clock line 318 and Data line 316 can be at one of two voltage levels. A data element having K bits may be encoded in a sequence of L symbols. The values of K and L may be determined based on encoding scheme, word size and configuration and other application parameters, including latency, etc. The timing diagram 800 illustrates an extract or snapshot of a symbol transmission sequence that includes 7 slots 804, where a symbol 806 may be transmitted in each of the slots 804. The 7 slots illustrated may be part of a larger symbol sequence such as a 12-symbol sequence that encodes a 16-bit word, or may include two or more sequences of symbols (e.g., 2, 3 . . . or 6 symbol examples, for example).

According to certain aspects disclosed herein, a transmitter 700 may be configured or adapted to ensure that the same symbol is not transmitted in any two consecutive slots in a sequence of slots 804. Accordingly, at least one of the Clock line 318 and Data line 316 changes signaling state at each boundary between consecutive symbols. The toggling of either of the Clock line 318 and Data line 316 marks the beginning of a new symbol.

Figure 9:
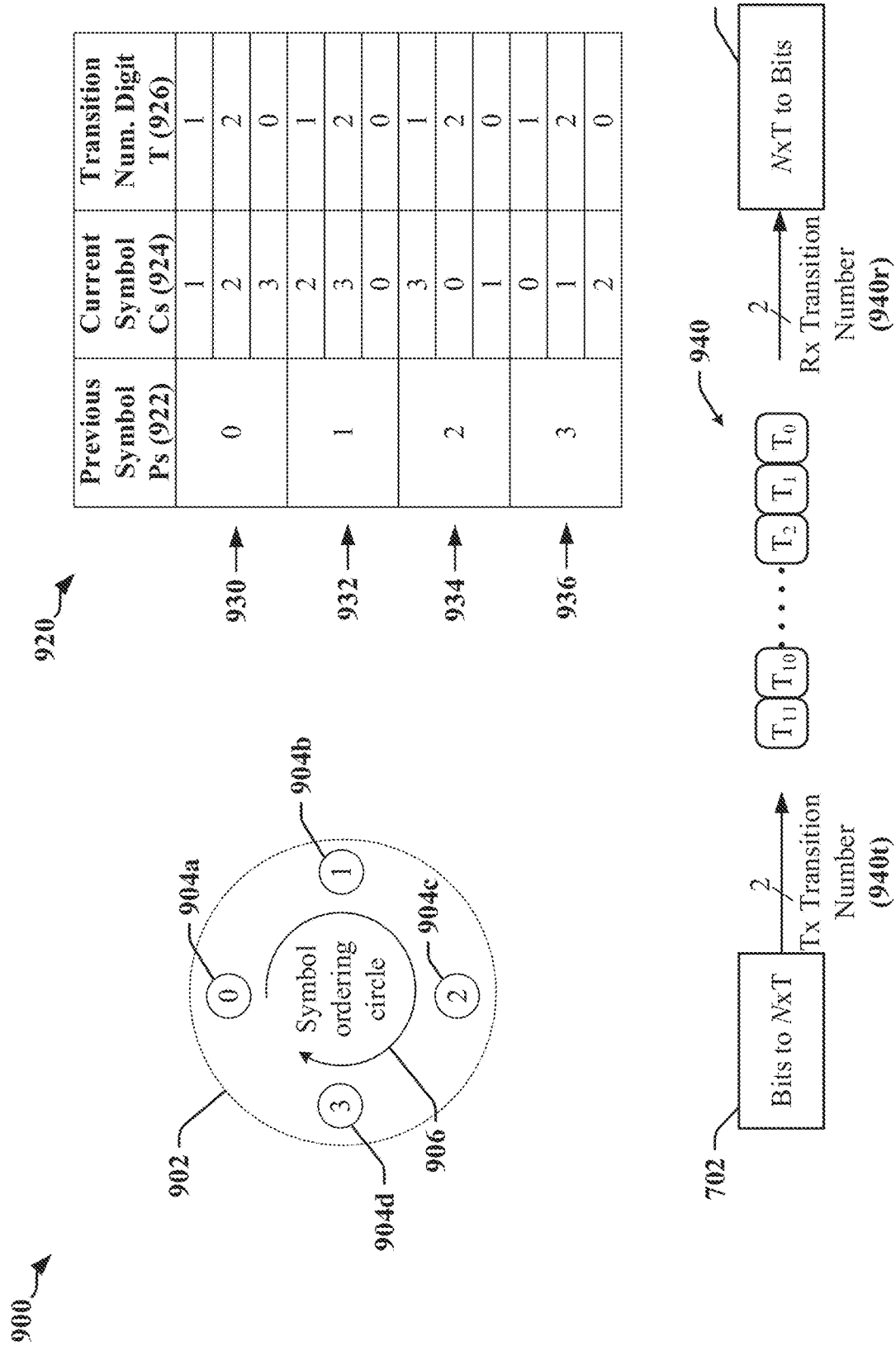
FIG. 9 illustrates a first example of an encoding scheme for transcoding data according to certain aspects disclosed herein.

FIG. 9 is a drawing illustrating a first example of an encoding scheme 900 that may be used by the ternary-to-symbols encoder 704 to produce a sequence of symbols 714 with an embedded clock for transmission on the serial bus 330. The encoding scheme 900 may also be used by a symbols-to-ternary decoder 724 to extract ternary transition numbers from symbols received from the serial bus 330. In this encoding scheme 900, the two wires of the serial bus 330 permit definition of 4 basic symbols 930, 932, 934, 936 (S: {0, 1, 2, 3}). Any two consecutive symbols in the sequence of symbols 714, 734 have different states, and the symbol sequences 0,0, 1,1, 2,2 and 3,3 are invalid combinations of consecutive symbols. Accordingly, only 3 valid symbol transitions are available at each symbol boundary, where the symbol boundary is determined by the transmit clock and represents the point at which a first symbol (previous symbol Ps) 922 terminates and a second symbol (current symbol Cs) 924 begins.

According to certain aspects disclosed herein, the three available transitions are assigned a transition number digit (T) 926 for each Ps symbol 922. The value of T 926 can be represented by a ternary number. In one example, the value of a transition number digit 926 may be determined by assigning a symbol-ordering circle 902 for the encoding scheme. The symbol-ordering circle 902 allocates locations 904a-904d on the symbol-ordering circle 902 for the four possible symbols, and a direction of rotation 906 between the locations 904a-904d. In the depicted example, the direction of rotation 906 is clockwise. The transition number digit 926 may represent the separation between the valid current symbols 924 and the immediately preceding symbol 922. Separation may be defined as the number of steps along the direction of rotation 906 on the symbol-ordering circle 902 required to reach the current symbol Cs 924 from the previous symbol 922. The number of steps can be expressed as a single digit base-3 number. It will be appreciated that a three-step difference between symbols can be represented as a $0_{base-3}$. The table 920 in FIG. 9 summarizes an encoding scheme employing this approach.

At the transmitter 700, the table 920 may be used to lookup a current symbol 924 to be transmitted, given knowledge of the previously generated symbol 922 and an input ternary number, which is used as a transition number digit 926. At the receiver 720, the table 920 may be used as a lookup to determine a transition number digit 926 that represents the transition between the previously received symbol 922 and the currently received symbol 924.

According to certain aspects, a transition number 940 may be formed from a plurality of transition number digits 926, each digit 926 being usable to determine a next symbol given a current symbol. In one example, the transition number 940 is a ternary number that includes 12 ternary digits 926. In the general case, a transition number 940 having N digits (Ts) 926 with r possible transitions for each T 926 has a total of $r^N$ states. In the example of a 12-digit transition number 940, there are a total of r=4−1=3 possible transitions for each of the N=12 digits 926, providing a total of $3^{12}$=531441 different states. Consequently, the 12-digit transition number 940 can encode 19-bit binary numbers which require 524288 states. The remaining 7153 states may be used to carry control codes, or the like.

A plurality of next-generation devices may coexist on the same serial bus 330 with one or more legacy I2C devices. Accordingly, the high data rate protocol defines signaling schemes that can be ignored, undetected or otherwise disregarded by legacy I2C devices. The I3C devices may transmit control information in signaling that is consistent with I2C mode signaling, and may transmit the data payload encoded according to ternary coding-based protocols to obtain faster transmission speeds. The next-generation devices may use other encoding modes for transmitting the data payload, including legacy I2C modes.

Figure 10:
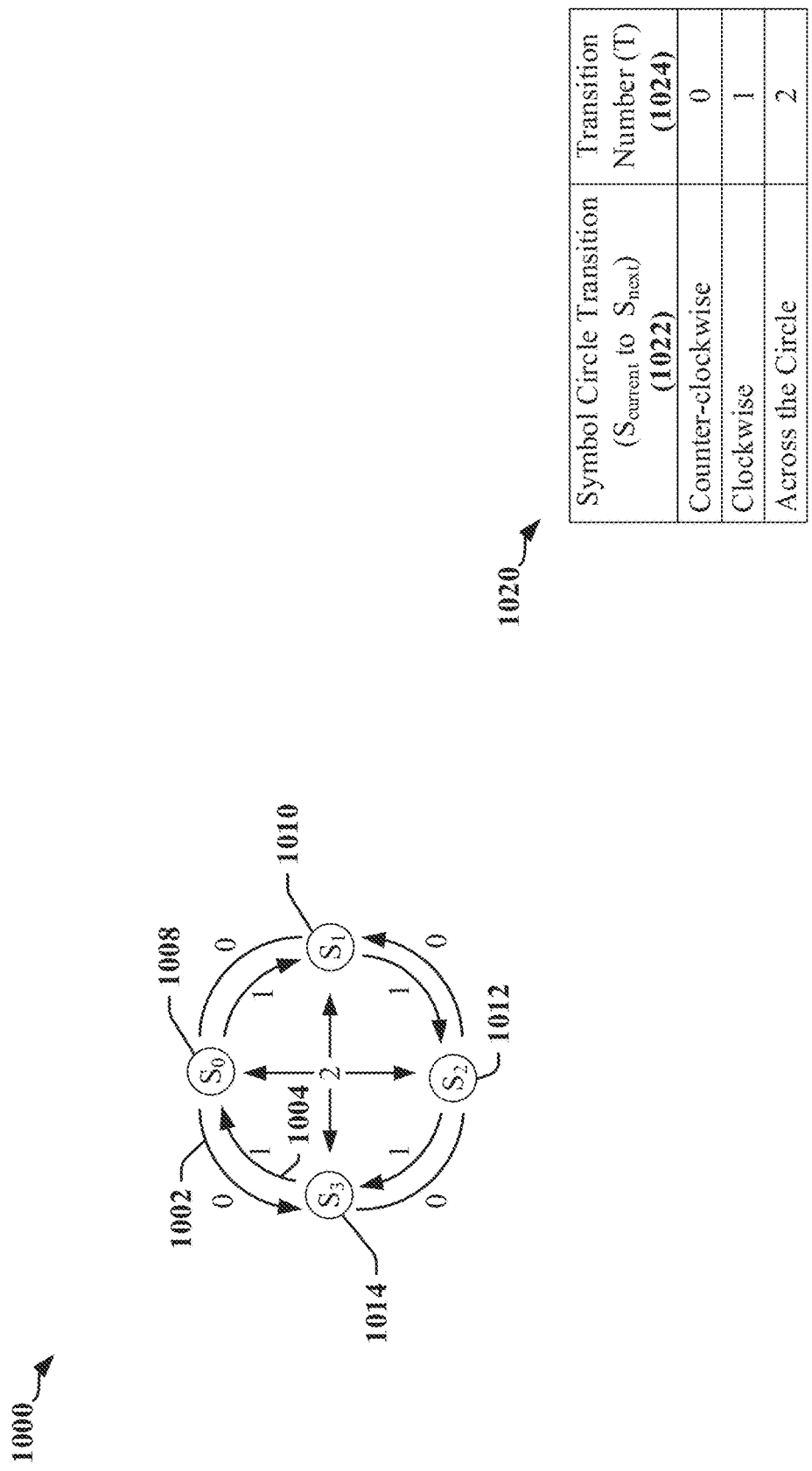
FIG. 10 illustrates a second example of an encoding scheme for transcoding data according to certain aspects disclosed herein.

FIG. 10 illustrates a second example of an encoding scheme 1000 employing symbol transition encoding on a two-wire serial bus 330. In this example, a variation of ternary-based number coding is employed in accordance with I3C HDR protocols. It is contemplated that certain concepts associated with symbol transitioning may be expanded to include an I3C serial bus 330 that has three or more wires. Septenary-based number coding may be used when three wires are available for transmitting symbols, pentadecimal-based number coding may be used when four wires are available for transmitting symbols, and so on. In the two-wire example represented in the table 1020 (see also FIGS. 7-9), the transition numbers 1024 generated by an encoder (e.g. the transcoder 702 in the transmitter 700 of FIG. 7) may be represented as a displacement value 1022 between states 1008, 1010, 1012, 1014 on and across a circle. A clockwise displacement 1004 may be represented as a ternary value T=1, a counter-clockwise displacement 1002 may be represented as a ternary value T=0, and a displacement across the circle (i.e., 2 steps clockwise or counterclockwise) may be represented as a ternary value T=2.

Other symbol encoding schemes may be implemented for two wire implementations and/or for implementations using more than two wires. In one example for N wires (W1 . . . WN), where N≥3, for three or more wires, encoding may be characterized by the transition number formula:

$$\{(W1_S \text{ XNOR } W1_{S-1}),(W2_S \text{ XNOR } W2_{S-1}), \ldots ,(WN_S \text{ XNOR } WN_{S-1})\},$$

for two consecutive states S and S−1.

Multi-Lane Serial Bus

Various examples discussed herein may be based on, or refer to a MIPI-defined I3C bus, and to HDR-DDR and HDR Ternary modes. The use of MIPI I3C HDR-DDR mode and other I3C modes are referenced as examples only, and the principles disclosed herein are applicable in other contexts.

In some instances, enhanced capability and speed increases may be obtained by the addition of one or more supplementary lines, enabling a change in the coding base to higher numbers. For example, in addition to a two-wire bus, many I2C legacy systems use one or more dedicated interrupt lines between a master device and one or more slave devices. These dedicated interrupt lines may be repurposed (along with the two-wire bus) when the master device switches from a predefined base protocol (e.g., I2C) to a second protocol in which data symbols are encoded across the two-wire bus and one or more dedicated interrupt lines.

In one example, data may be encoded using transition encoding to obtain symbols for transmission over a two-line serial bus and one or more additional lines. When a single additional line is available, the second protocol can transmit 8 symbols over 3 wires (as compared to only 4 symbols over 2 wires), thus allowing for coding in base 7.

In another example, when a two-line I3C bus operated in SDR mode or HDR-DDR mode can be extended with one or more additional lines, data can be transmitted on the additional lines in accordance with the timing provided by a clock signal transmitted on the Clock line. In some instances, data encoded according to SDR or HDR-DDR protocols may be carried on the primary lines of the two-line I3C bus while additional data is encoded in phase differential symbols carried on two or more additional lines. The timing provided by the clock signal may also be embedded in the transitions between signaling states of the additional lines used to carry phase differential symbols.

Timing information may be embedded in state transitions between symbols by ensuring that the same symbol is not transmitted in consecutive symbols using, for example one of the encoding schemes 900, 1000 illustrated in FIGS. 9 and 10. The elimination of the possibility of signaling state repetition allows N−1 possible transitions between symbols when N signaling states are available for the number of lines used to carry the phase differential symbols. In this description, different types of symbols may be described, including static symbols that define signaling state of the lines used to carry the symbols, and phase-differential symbols that are selected by a transition number and the previous static symbol.

Figure 11:
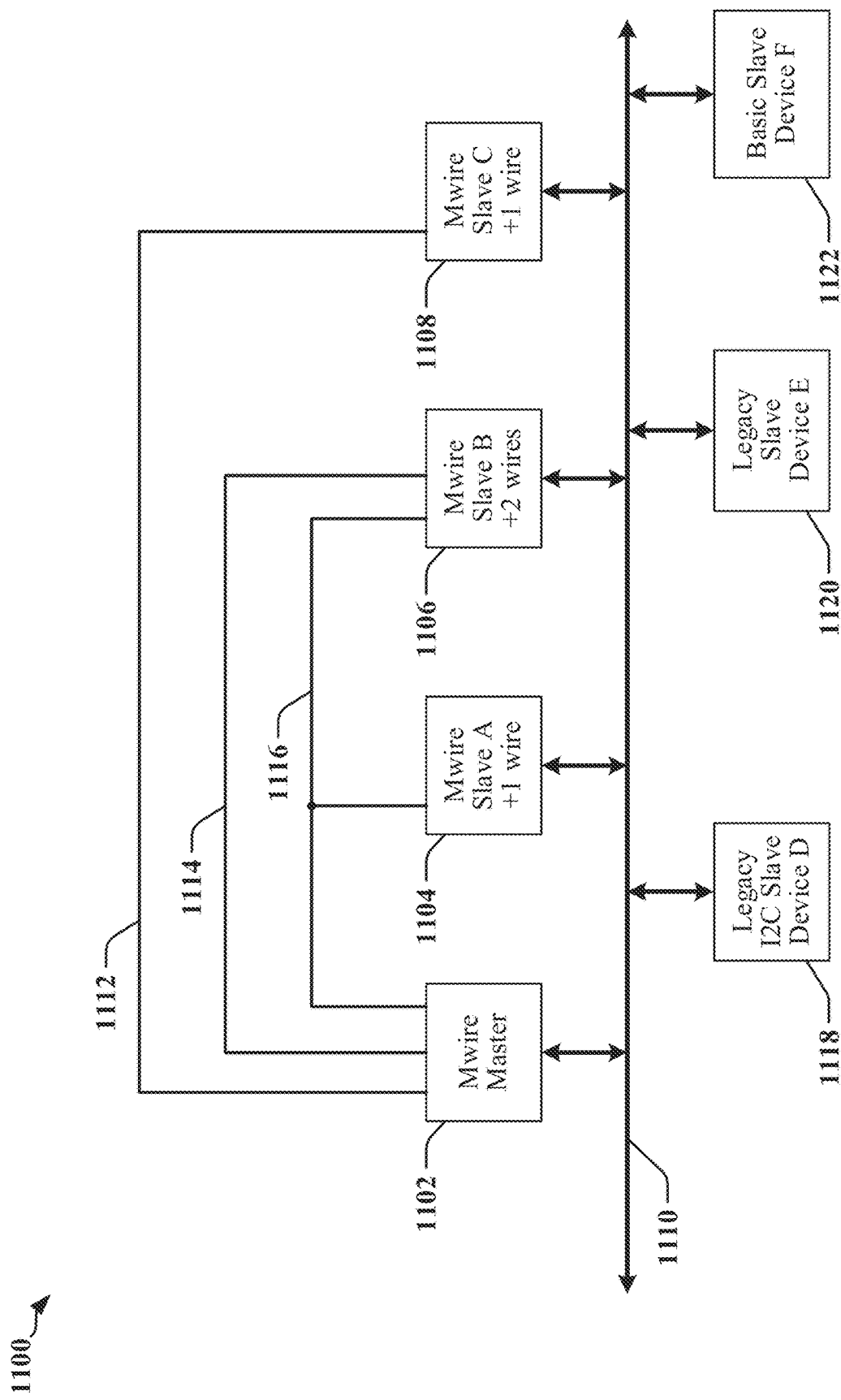
FIG. 11 illustrates a serial bus in which more than two connectors or wires may be available for timeshared communication between devices.

FIG. 11 illustrates a serial bus 1100 in which more than two connectors or wires may be available for timeshared communication between devices 1102, 1104, 1106, and/or 1108. Devices 1102, 1104, 1106, and/or 1108 that can support communication over an expanded serial bus that includes additional wires may be referred to as multi-wire (Mwire) devices or multi-lane devices. Note that the terms "connector", "wire", and "line" may be interchangeably used herein to refer to an electrically conductive path. In some instances, a "connector", "wire", and "line" may apply to an optically conductive path. In addition to the common lines 316, 318 of a 2-wire I3C bus, additional connectors or wires 1112, 1114, and/or 1116 may be employed to couple an Mwire master device 1102 to one or more Mwire slave devices 1104, 1106, and/or 1108 separately from the serial bus 1110. In one example, one Mwire slave device 1108 may be connected to the Mwire master device 1102 using a single, dedicated additional connector or wire 1112. In another example, one Mwire slave device 1104 may be connected to the Mwire master device 1102 using a single, shared additional connector or wire 1116. In another example, one Mwire slave device 1106 may be connected to the Mwire master device 1102 using two or more dedicated and/or shared additional connectors or wires 1114 and 1116. The number, type and arrangement of additional connectors or wires 1112, 1114, and/or 1116 can be selected to balance bandwidth and power consumption for communications between Mwire devices 1102, 1104, 1106, and/or 1108. In some instances, the additional connectors may include optical or other types of connectors.

According to certain aspects, any number of wires that is greater than two physical lines can be used in an I3C interface. Two of the wires may be common wires, such as the Clock line 318 and Data line 316 wires that are used for communicating with legacy devices 1118, 1120 and/or I3C devices 1122 that are not configured for multi-lane operation. Legacy devices 1118, 1120 may include I2C device 1118, an I3C device 1122, or another type of device that uses a two-wire protocol compatible with other devices 1102, 1104, 1106, 1108, 1118, 1120, 1122 coupled to the serial bus 1110.

Bus management messages may be included in serial bus management protocols implemented on the Mwire-capable bus client devices 1102, 1104, 1106, and 1108. Bus management messages may be transferred between Mwire-capable devices 1102, 1104, 1106, and 1108 using the two-wire serial bus 1110. Bus management messages may include address arbitration commands and/or messages, commands and/or messages related to data transport mode entry and exit, commands and/or messages used in the exchange of configuration data including, for example, messages identifying supported protocols, number and allocation of available physical wires, and commands and/or messages that are to negotiate or select a mode of communications.

As illustrated in FIG. 11, different legacy client devices 1118 and 1120 and I3C devices 1122 that have more basic signaling capabilities may be supported by the I3C interface. The devices 1102, 1104, 1106, 1108, 1118, 1120, 1122 coupled to the serial bus 1110 are compatible with at least one common mode of communication (e.g., predefined base protocol over a two-wire serial bus 1110). In one example the predefined base protocol (e.g., lowest common denominator protocol), may support an I2C mode of communication. In this latter example, each of the devices 1102, 1104, 1106, 1108, 1118, 1120, 1122 may be adapted to at least recognize start and stop conditions defined by the predefined base protocol.

Two or more devices 1102, 1104, 1106, 1108, 1120, and/or 1122 may communicate using a second protocol (e.g., I3C SDR, I3C HDR-DDR, I3C HDR-Ternary) that is not supported by some of the other devices coupled to the serial bus 1110. The two or more devices 1102, 1104, 1106, 1108, 1118, 1120, 1122 may identify capabilities of the other devices using the predefined base protocol (e.g., an I2C protocol), after an I3C exchange is initiated, and/or through signaling on one or more additional connectors or wires 1112, 1114 and/or 1116. In at least some instances, the configuration of devices coupled to the serial bus 1110 may be predefined in the devices 1102, 1104, 1106, 1108, 1118, 1120, 1122.

The additional connectors or wires 1112, 1114 and/or 1116 may include multipurpose, reconfigurable connectors, wires, or lines that connect two or more of the Mwire devices 1102, 1104, 1106, 1108. The additional connectors or wires 1112, 1114 and/or 1116 may include repurposed connections that may otherwise provide inter-processor communications capabilities including, for example interrupts, messaging and/or communications related to events. In some instances, the additional connectors or wires 1112, 1114 and/or 1116 may be provided by design. In one example, the predefined base protocol may utilize the additional connectors or wires 1112, 1114 and/or 1116 for sending interrupts from the slave devices to the master device. In the second protocol, the additional connectors or wires 1112, 1114 and/or 1116 may be repurposed to transmit data in combination with the two-wire bus. The term "data lane" may be used herein to refer to a data line or wire used to communicate data when a device can support multiple data lines or wires (multiple data lanes).

Master and Slave roles are typically interchangeable between Mwire devices 1102, 1104, 1106, 1108, and FIG. 5 relates to a single interaction between two or more of the devices 1102, 1104, 1106, 1108, and/or 1122. As illustrated, the current master device 1102 can support extended communication capabilities with the other Mwire devices 1104, 1106, 1108, using a combination of the additional connectors or wires 1112, 1114, and 1116. The master Mwire device 1102 is connected to two slave devices 1104 and 1108 using a single additional connector or wire 1116 and 1112, respectively. The master Mwire device 1102 is connected to one slave device 1106 using a pair of additional wires 1114 and 1116. Accordingly, the master Mwire device 1102 may be configured to select a number of wires for communication based on the capabilities of all slave devices 1104, 1106, and/or 1108 that are involved in a transaction. For example, the Mwire master device 1102 may send data to the first Mwire slave device B 1106 using the two-wire serial bus 1110 plus both repurposed wires 1114 and 1116. Additionally, the Mwire master device 1102 may send data to the second Mwire slave device A 1104 using the two-wire serial bus 1110 plus a first repurposed wire 1116.

Data transmitted between two or more Mwire-capable devices 1102, 1104, 1106, and/or 1108 may be encoded using an adapted encoding scheme. One aspect provides for adapting a transition encoding scheme (e.g., I3C HDR-Ternary) to encode data over three or more wires by repurposing any additional available wires, connectors, or lines between a master device and a slave device. In this manner, the two-wire serial bus 1110 and one or additional connectors or wires 1112, 1114, and/or 1116 may be used to transmit data using all data wires for I3C SDR and I3C HDR-DDR modes, and data may be encoded in symbols for transmission over clock and all data wires in HDR-Ternary mode.

Figure 12:
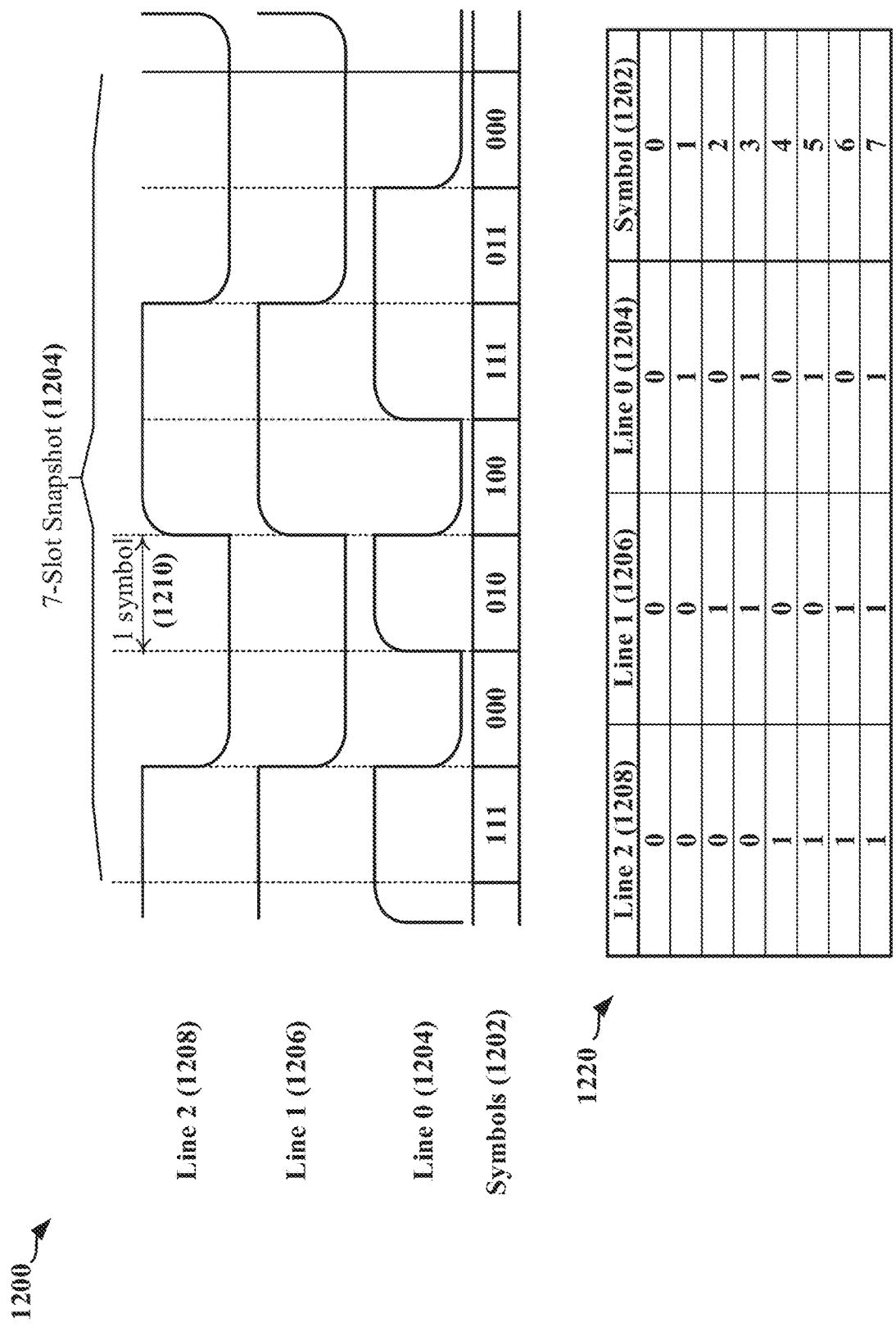
FIG. 12 illustrates an example of encoding data in symbols across three or more conductors or wires.

In a first Mwire example, data may be encoded in 3-bit symbols when three connectors, lines or wires 316, 318, 1112, 1114, and/or 1116 are available, and data may be encoded in 4-bit symbols when four connectors, lines or wires 316, 318, 1112, 1114, and/or 1116 are available, and so on. FIG. 12 provides an example 1200 illustrating the encoding of data in symbols across three conductors or wires. A sequence of 7 symbols is illustrated, although data elements may be encoded in any number of symbols and/or symbols having any number of wires, lines or connectors. In the example, data is encoded in symbols 1202 that control the signaling state of three connectors 1204, 1206 and 1208 in each time slot 1210 corresponding to a symbol transmission interval. The table 1220 illustrates one example of mapping three-bit symbols 1202 to signaling states that can have one of two levels. Transmit clock information may be encoded in the transitions in signaling state between consecutive symbols. In one example, the clock information may be embedded in signaling states transitions of the common connectors, wires or lines 316, 318, with the additional connector or wires 1112, 1114, and/or 1116 being used to carry one additional bit in each symbol. However, certain devices 1102, 1104, 1106 or 1108 may be configured to increase data throughput even further by extracting clock information from transitions that occur on any of the connectors used in a communications transaction.

In the example of a three-wire connection, 8 possible symbols can be defined, as illustrated in the table 1220 of FIG. 12. Consequently, there are 7 possible transition characters, $\{T_0 \ldots T_6\}$ for each transition between symbols, when a transition is to be guaranteed at each boundary between consecutive symbols. A transition number can be formed that has 12 Base-7 digits (i.e., septenary numbering scheme). In the general case discussed herein, a transition number having N digits with r possible transitions for each digit has a total of $r^N$ states. In the example of a 12-digit transition number transmitted on an I3C, there are a total of r=8−1=7 possible transitions for each of the N=12 digits, providing a total of $7^{12}$=13841287201 different states, which may be expressed as the hexadecimal number 0x52801AE1. Consequently, the 12-digit transition number can encode a 33-bit binary numbers, which may use 8,589,934,592 states. The remaining 5251352610 states may be used to carry control codes, or the like.

In an Mwire example involving I3C SDR or I3C HDR-DDR, data may be transmitted over two connectors, lines or wires 316, 318, 1112, 1114, and/or 1116 when one additional wire is available, and data may be transmitted over 4 connectors, lines or wires 316, 318, 1112, 1114, and/or 1116 when 3 additional wires are available, and so on.

Figure 13:
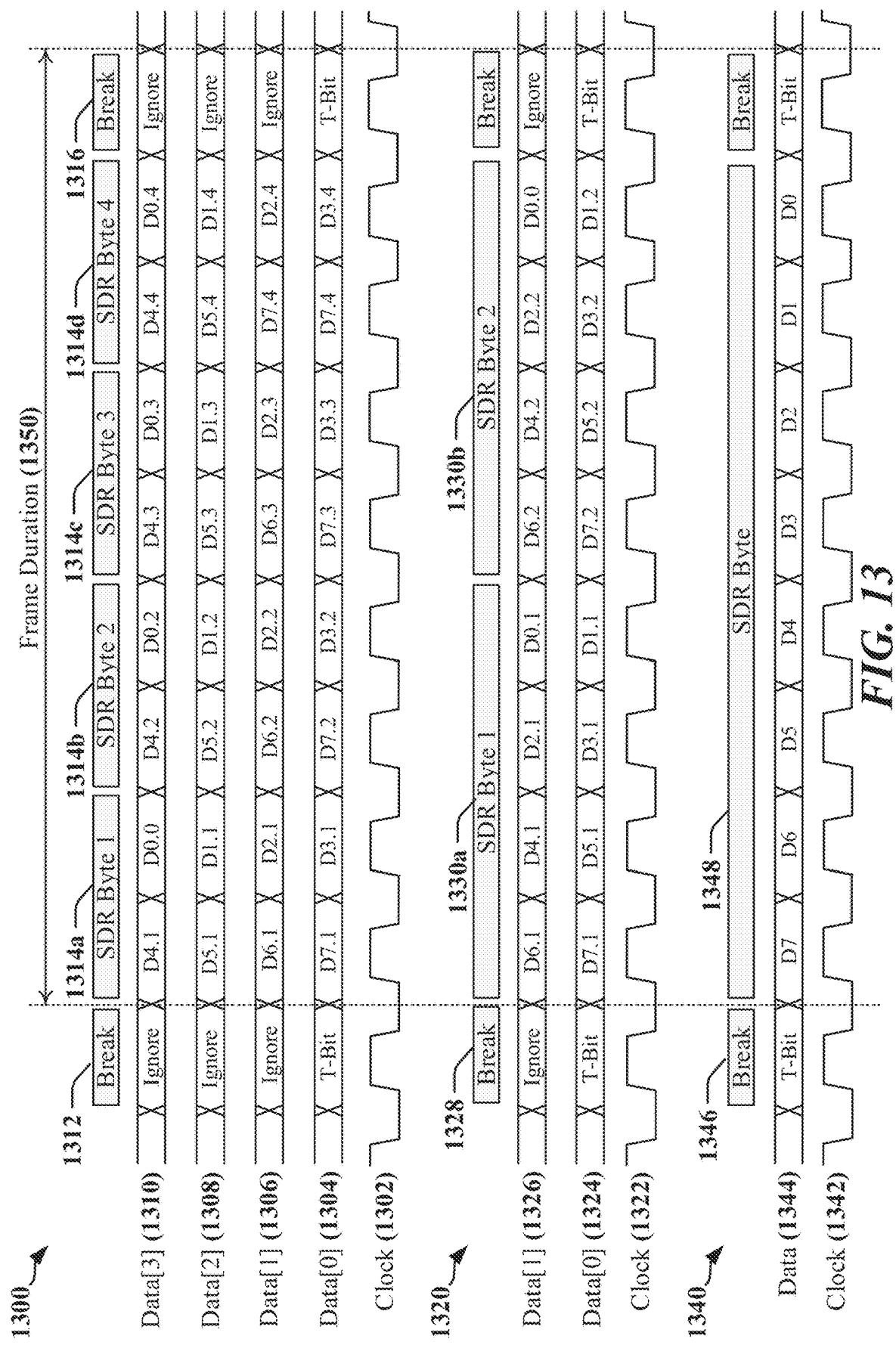
FIG. 13 illustrates the transmission of data over an I3C serial bus operated in an SDR mode when two or more devices can be coupled to additional connectors, wires or lines.

FIG. 13 provides examples 1300, 1320, 1340 illustrating the transmission of data over an I3C serial bus operated in an SDR mode when two or more devices can be coupled to additional connectors, lines or wires 1112, 1114, and/or 1116. In each example, 1300, 1320, 1340 a common transaction and/or frame duration 1350 is maintained regardless of the number of additional wires used. For example, a transaction that involves the use of 2 data wires and one clock wire can communicate twice as many bits as a transaction that uses 1 data wire and one clock signal. The additional bits may include payload data bits, parity bits, other protocol-defined bits and/or other information. In some instances, a parity bit may be transmitted on each wire concurrently with a single clock pulse. The maintenance of a common transaction and/or frame duration 1350 can maintain a constant separation between break points 1312, 1316 (T-bits), and devices coupled to the bus and configured for a conventional two-wire mode of operation remain unaware of the use of additional wires. The common transaction and/or frame duration 1350 may effectively define a cadence for bus operations.

In the first example 1340, no additional wires are used and communication proceeds using two wires (clock lane 1342 and one data lane 1344). A serialized data byte 1348 may be transmitted on the data lane 1344 after a T-bit and breaking point 1346, and while a clock signal is transmitted on the clock lane 1342. In another example 1320, one additional wire is used and communication proceeds using three wires (clock lane 1322 and two data lanes 1324, 1326). Two data bytes 1330a, 1330b may be transmitted using the data lanes 1324, 1326 after a T-bit and breaking point 1328, and while a clock signal is transmitted on the clock lane 1322. In the example, the data bytes 1330a, 1330b are transmitted in a striped mode, whereby a first data byte 1330a is completely transmitted in two-bit nibbles on the two data wires before the second data byte 1330b is transmitted. In other implementations, data bytes may be transmitted in parallel on the two data wires. In another example 1300, three additional wires are used and communication proceeds using five wires (clock lane 1302 and four data lanes 1304, 1306, 1308, 1310). Four data bytes 1314a, 1314b, 1314c and 1314d may be transmitted after a T-bit and breaking point 1312, and while a clock signal is transmitted on the clock lane 1302. In the example, the data bytes 1314a, 1314b, 1314c, 1314d are transmitted in a striped mode, whereby a first data byte 1314a is completely transmitted in four-bit nibbles on the four data lanes 1304, 1306, 1308, 1310 before the second data byte 1314b is transmitted. In other implementations, data bytes may be transmitted in parallel on the four data lanes 1304, 1306, 1308, 1310. In each of the examples 1300, 1320, 1340 in FIG. 13, data is clocked on one edge of each clock pulse in the clock signal, in accordance with I3C SDR protocols.

Figure 14:
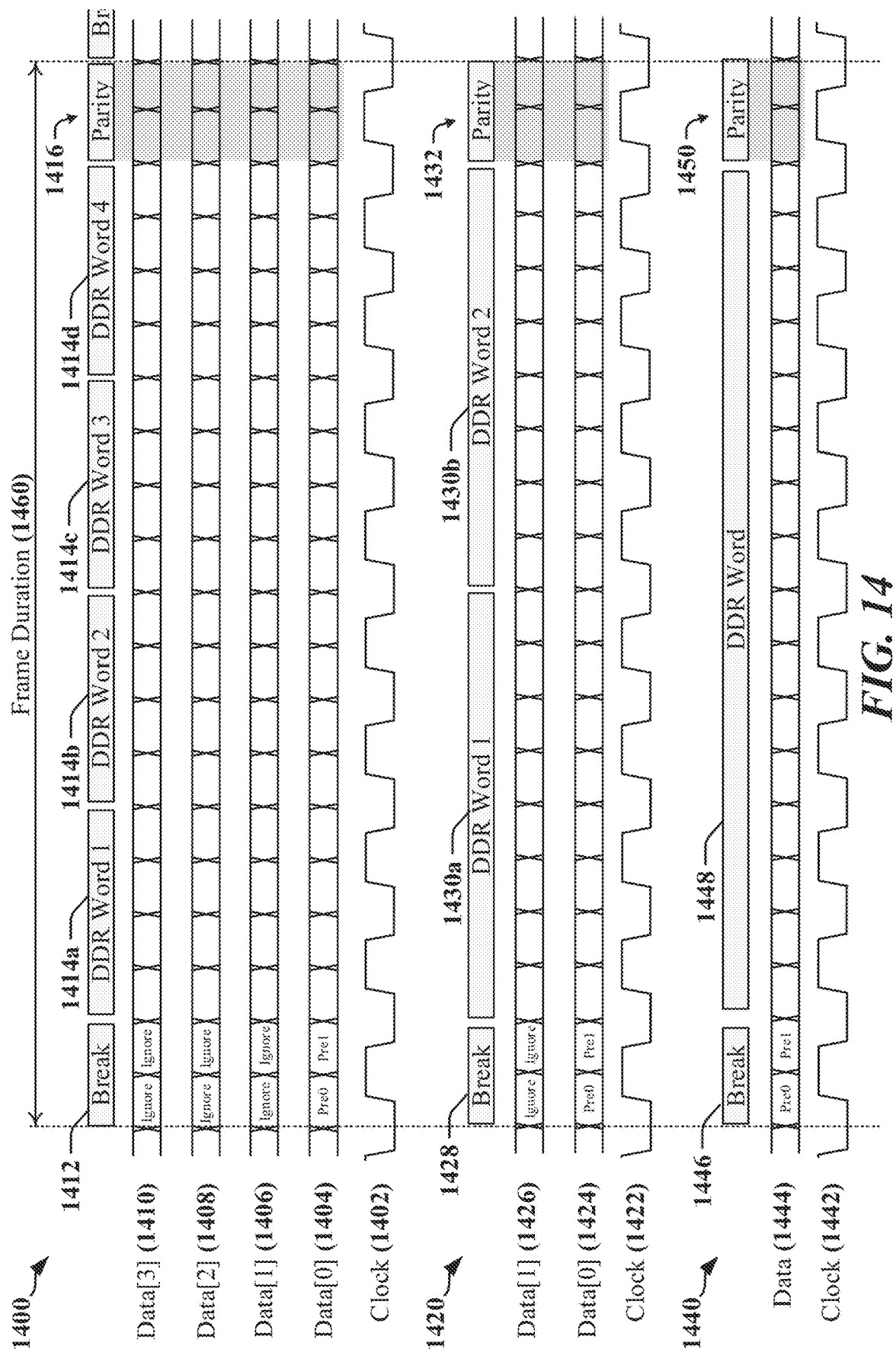
FIG. 14 relates to an HDR-DDR mode of operation in which data is clocked on both edges of each clock pulse in the clock signal.

FIG. 14 relates to an HDR-DDR mode of operation in which data is clocked on both edges of each clock pulse in the clock signal. FIG. 14 illustrates examples 1400, 1420, 1440 of data transmission data over an I3C serial bus operated in HDR_DDR mode when two or more devices can be coupled to additional connectors, lines or wires 1112, 1114, and/or 1116. In each example, 1400, 1420, 1440 a common transaction and/or frame duration 1460 is maintained regardless of the number of additional wires used. For example, a transaction that involves the use of 2 data wires and one clock wire can communicate twice as many bits as a transaction that uses 1 data wire and one clock signal. The additional bits include payload data bits, parity bits, other protocol bits, and/or other information. For example, parity bits 1416, 1432, 1450 are transmitted concurrently with a single clock pulse on each data wire. The parity bits 1416, 1432, 1450 are transmitted in the same time-slot (relative to the start of the transaction or frame) in each example 1400, 1420, 1440. The maintenance of a common transaction and/or frame duration 1350 can maintain a constant separation between break points 1312, 1316 (T-bits), and devices coupled to the bus and configured for a conventional two-wire mode of operation remain unaware of the use of additional wires. The common transaction and/or frame duration 1350 may effectively define a cadence for bus operations.

In the first example 1440, no additional wires are used and communication proceeds using two wires (clock lane 1442 and one data lane 1444). A serialized 16-bit data word 1448 may be transmitted over the data lane 1444 after two preamble bits and breaking point 1446, and while a clock signal is transmitted on the clock lane 1442. Two parity bits 1450 may be transmitted after the data word 1448. In a second example 1420, one additional wire is used and communication proceeds using three wires (clock lane 1422 and two data lanes 1424, 1426). Two 16-bit data words 1430a, 1430b may be transmitted using the data lanes 1424, 1426 after two preamble bits and breaking point 1428, and while a clock signal is transmitted on the clock lane 1422. Two parity bits 1450 may be transmitted on each data lane 1424, 1426 after the data words 1430a, 1430b, providing a total of four parity bits. In the example, the data words 1430a, 1430b are transmitted in a striped mode, whereby a first data word 1430a is completely transmitted in two-bit nibbles on the two data wires before the second data word 1430b is transmitted. In other implementations, data words may be transmitted in parallel on the two data wires. In another example 1400, three additional wires are used and communication proceeds using five wires (clock lane 1402 and four data lanes 1404, 1406, 1408, 1410). Four data words 1414a, 1414b, 1414c and 1414d may be transmitted using the data lanes 1404, 1406, 1408, 1410 after two preamble bits and breaking point 1412, and while a clock signal is transmitted on the clock lane 1402. In the example, the data words 1414a, 1414b, 1414c, 1414d are transmitted in a striped mode, whereby a first data word 1414a is completely transmitted in four-bit nibbles on the four data lanes 1404, 1406, 1408, 1410 before the second data word 1414*b* is transmitted. In other implementations, data words may be transmitted in parallel on the four data lanes 1404, 1406, 1408, 1410. The preamble bits are typically transmitted on the primary data lane 1404 of the two-wire I3C bus, and signaling state of the additional connectors, lines or wires or lanes 1406, 1408, 1410 may be ignored by a receiver.

The examples 1400, 1420, 1440 illustrated in FIG. 14 provide a number of parity bits that can be used to provide enhance error detection and correction capabilities. In one example, the parity bits transmitted on the data wire of the on the base 2-wire I3C are preserved and configured in accordance with I3C specifications. For example, a 2-bit cyclic redundancy check for the preceding data words 1448, 1430*a*-1430*b*, 1414*a*-1414*d* may be transmitted in the two-bit field designated by the I3C Specifications. In another example, a two-bit cyclic redundancy check (CRC) value can be transmitted on each additional data lane, calculated from the bits transmitted over the corresponding additional data lane. In another example, a CRC sized according to the number of available parity bits may be calculated from the preceding data words 1448, 1430*a*-1430*b*, 1414*a*-1414*d* bits. For example, a two-bit CRC may be transmitted when no additional lines are available, a four-bit CRC may be transmitted when one additional line is available, and an eight-bit CRC may be transmitted when three additional lines are available. In another example, the parity bits may be used to implement a block-parity error detection and correction scheme.

As illustrated in certain of the examples, a multilane (ML) extension of an I3C bus may be implemented to provide increased data throughput, while keeping the I3C Interface bus management procedures. I3C frame settings are preserved to provide break points 1312, 1328, 1346, 1412, 1428, 1446 at the expected time defined by the conventional I3C specifications. The ML version of the I3C interface permits devices of single, dual or quad data lanes to be connected on the same two-wire base lanes. ML-capable devices can be enabled a priori, with available data lanes enabled or supported.

Figure 15:
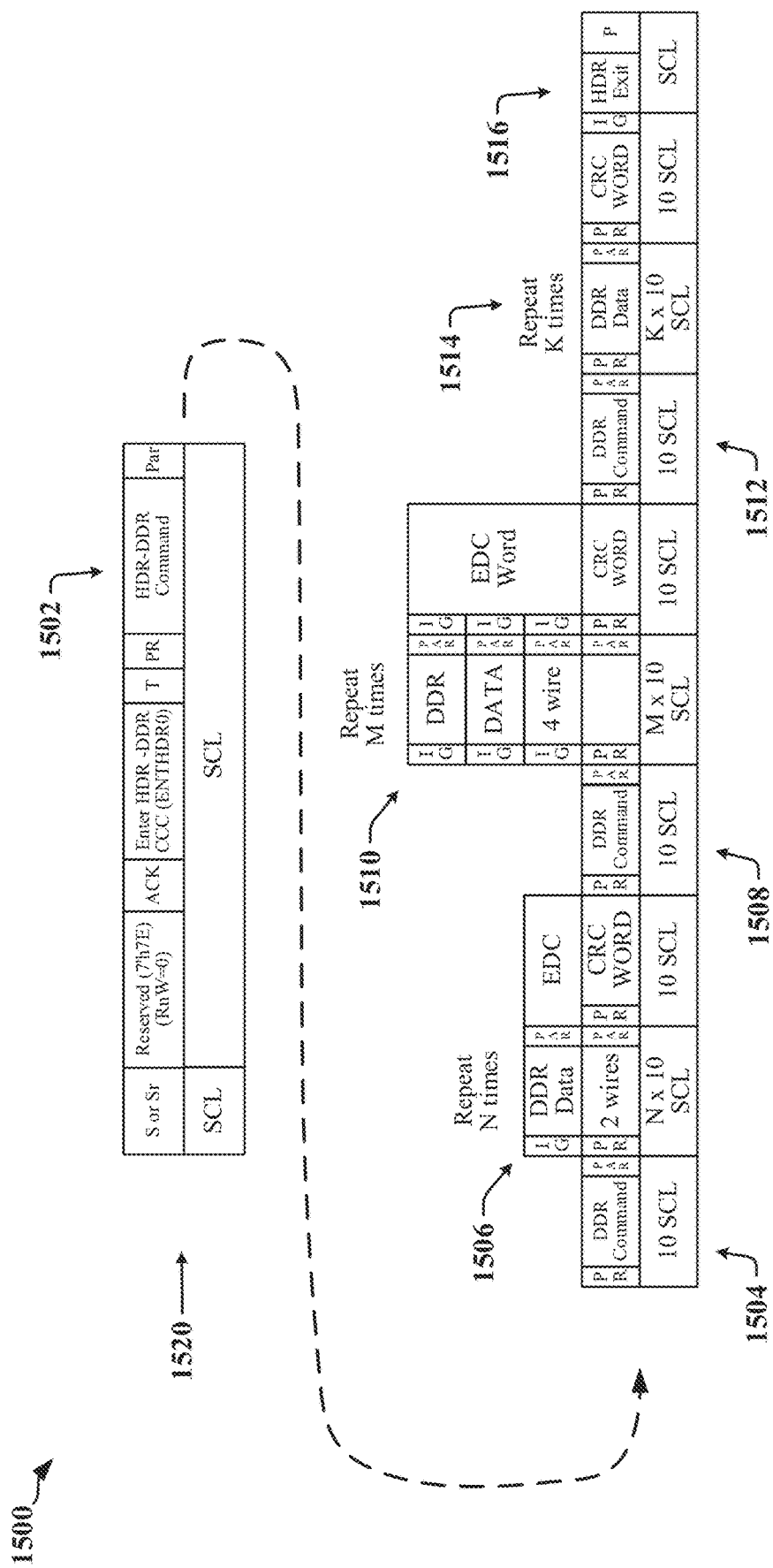
FIG. 15 is an example of a timeline illustrating the operation of a multi-lane enabled bus.

According to certain aspects, an ML version of an I3C bus may be dynamically switched between modes of operation and may select a number of data lanes, or symbol bit-size for use between ML-enabled devices. FIG. 15 is an example of a timeline 1500 illustrating the operation of an ML-enabled I3C bus. The I3C bus may initially be configured for a mode of operation supported by all devices coupled to the I3C bus, which may be SDR mode for example. An initial transmission 1520, that includes a first command 1502 may be initiated in the SDR mode. In one example, the first command 1502 includes a common command code (CCC) that causes one or more devices coupled to the I3C bus to be operated in HDR-DDR mode. A second command 1504 is transmitted in HDR-DDR mode to select a bus width and other parameters for a first transaction 1506 to be executed in the HDR-DDR mode. In the illustrated example, the second command 1504 causes data to be transmitted over the I3C bus and one additional wire. The first transaction 1506 may include transmission of a number (N) of 16-bit data words followed by a CRC word. In some instances, the one or more devices may remain in the HDR-DDR mode and/or may continue to use the selected bus width until one or more new commands are transmitted that cause the one or more devices to modify mode of operation and/or bus width.

In some implementations, the number of wires used by devices may be preconfigured during manufacture, assembly and/or system configuration. In at least some instances, commands may be transmitted to modify preconfigured definitions of bus width.

A third command 1508 is transmitted in HDR-DDR mode to select a bus width and other parameters for a second transaction 1510 to be executed in the HDR-DDR mode. In the illustrated example, the third command 1508 causes data to be transmitted over the I3C bus and three additional wires. The second transaction 1510 may include transmission of a number (M) of 16-bit data words followed by a CRC word. A fourth command 1512 is transmitted in HDR-DDR mode to select a bus width and other parameters for a third transaction 1514 to be executed in the HDR-DDR mode. In the illustrated example, the fourth command 1512 causes data to be transmitted over the I3C bus and no additional wires. The third transaction 1514 may include transmission of a number (K) of 16-bit data words followed by a CRC word. An HDR Exit 1516 may be transmitted after completion of the third transaction 1514.

Heterogeneous Multi-Lane Serial Bus

Additional physical lanes in a serial bus to couple two or more devices can be used as additional data lanes to increase data throughput, provide error detection protection features, improve signal integrity, extend physical range of the serial bus, and/or for other purposes.

Certain aspects of the disclosure provide configurations of the additional lanes to support efficient encoding of data to be transmitted over the serial bus. I3C standards support multiple high data-rate (HDR) protocols, including DDR mode and phase-differential signaling modes. Phase-differential signaling modes encode data in symbols that control signaling state of multiple wires of the serial bus. Phase-differential signaling provides certain advantages with respect to clock-line based protocols. For example, phase-differential signaling can minimize the number of transitions on the lanes of the serial bus, and the use of common drivers for the data may improve signal integrity and support increased reach of the bus. Conventional I3C specifications provide a Ternary Symbol Legacy Mode (HDR-TSL) that is usable on a serial bus that couples legacy I2C devices, and Ternary Symbol for Pure Bus Mode (HDR-TSP) that is usable on a serial bus that couples only I3C devices.

Figure 16:
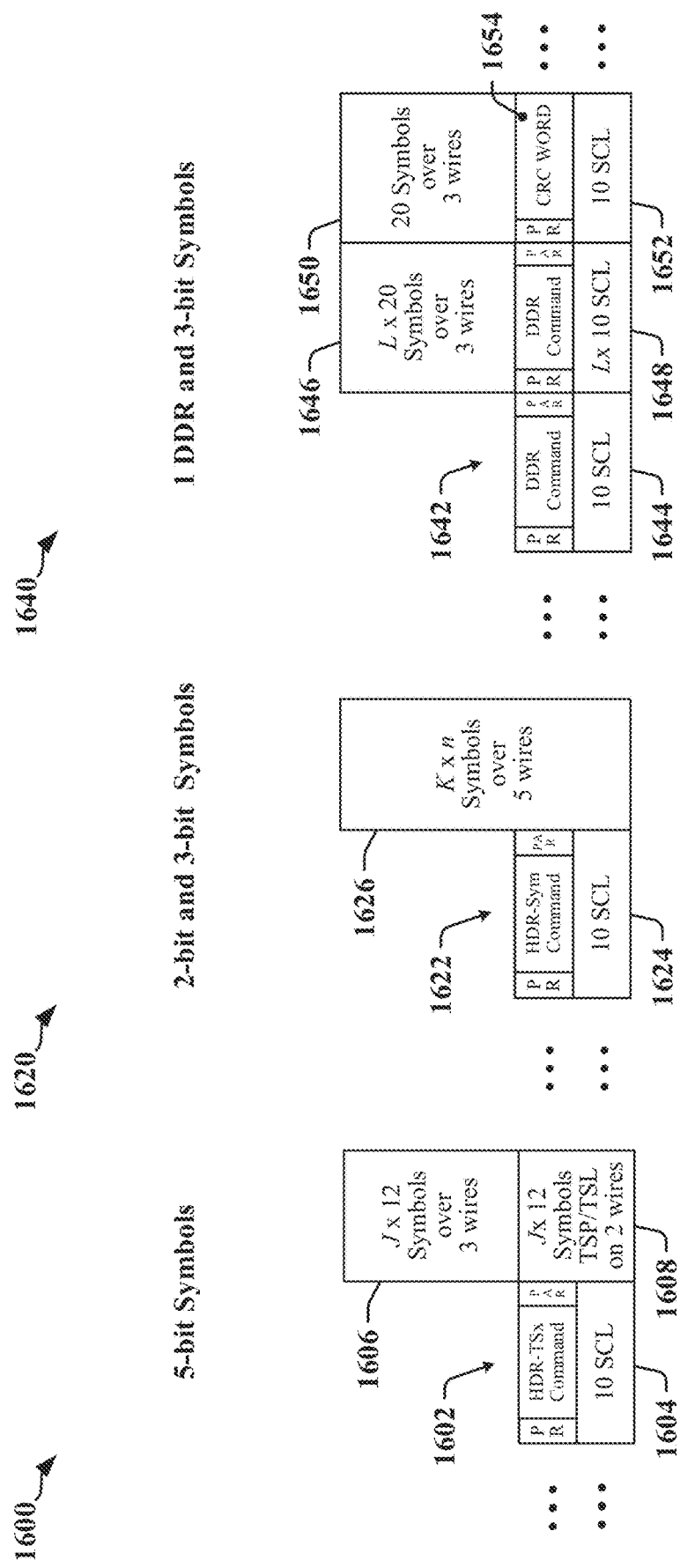
FIG. 16 illustrates examples of configuration of a multi-lane serial bus in accordance with certain aspects disclosed herein.
Figure 17:
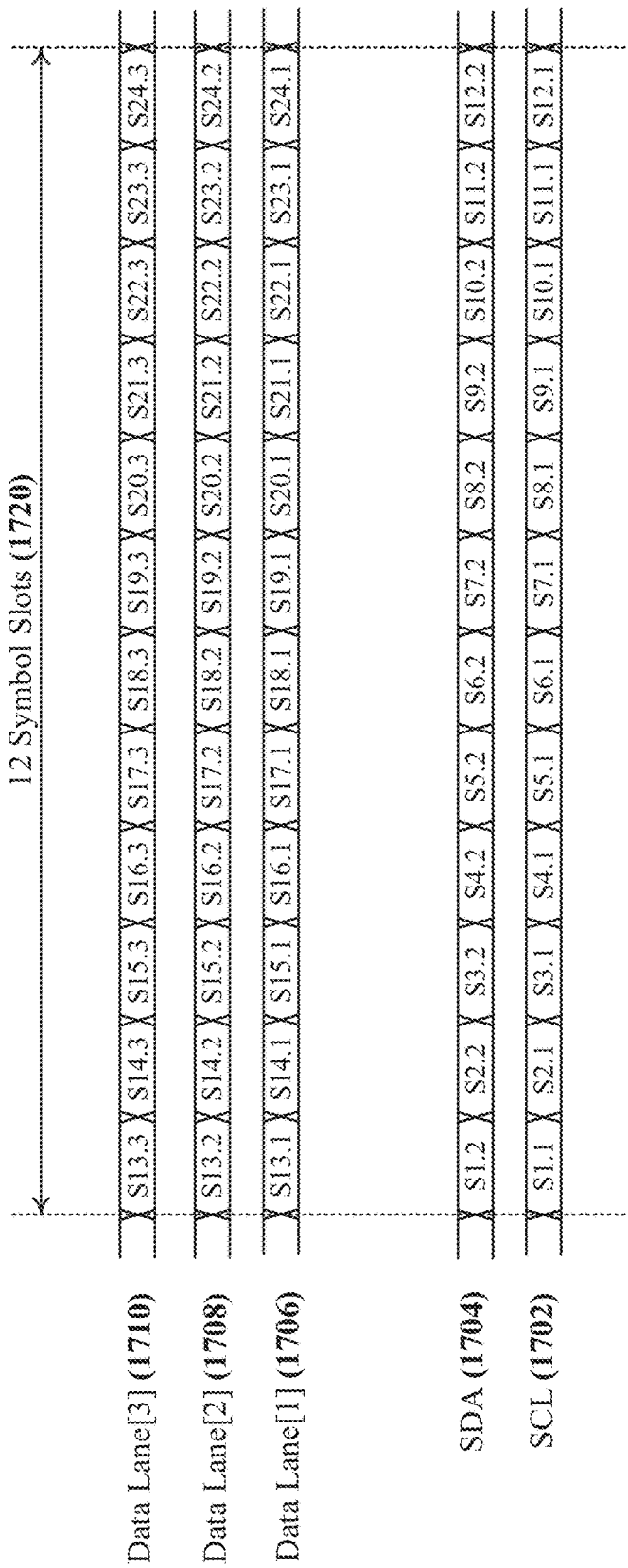
FIG. 17 illustrates transmissions over a multiline serial bus configured in a first mode according to certain aspects disclosed herein.
Figure 18:
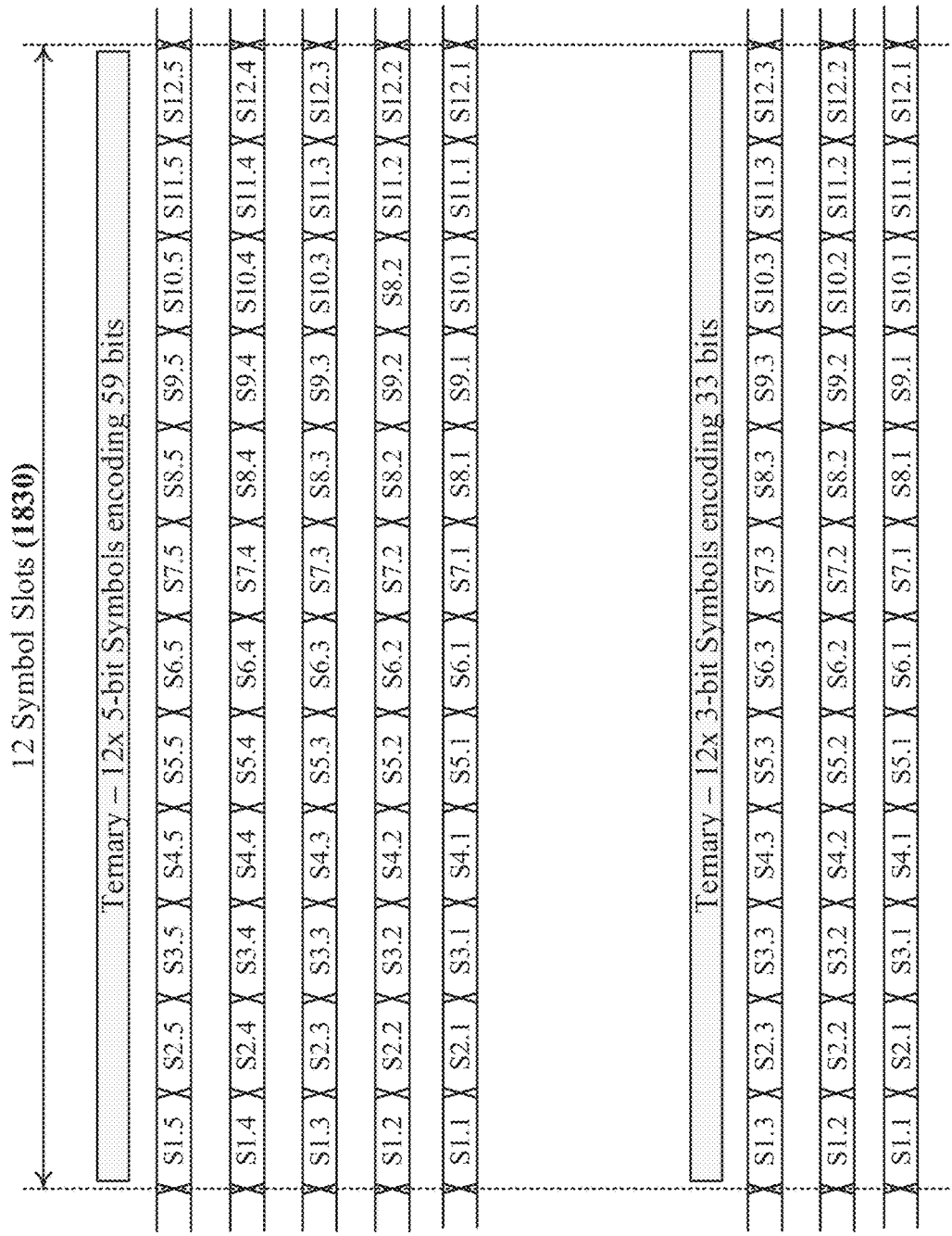
FIG. 18 illustrates transmissions over a multiline serial bus configured in a second mode according to certain aspects disclosed herein.
Figure 19:
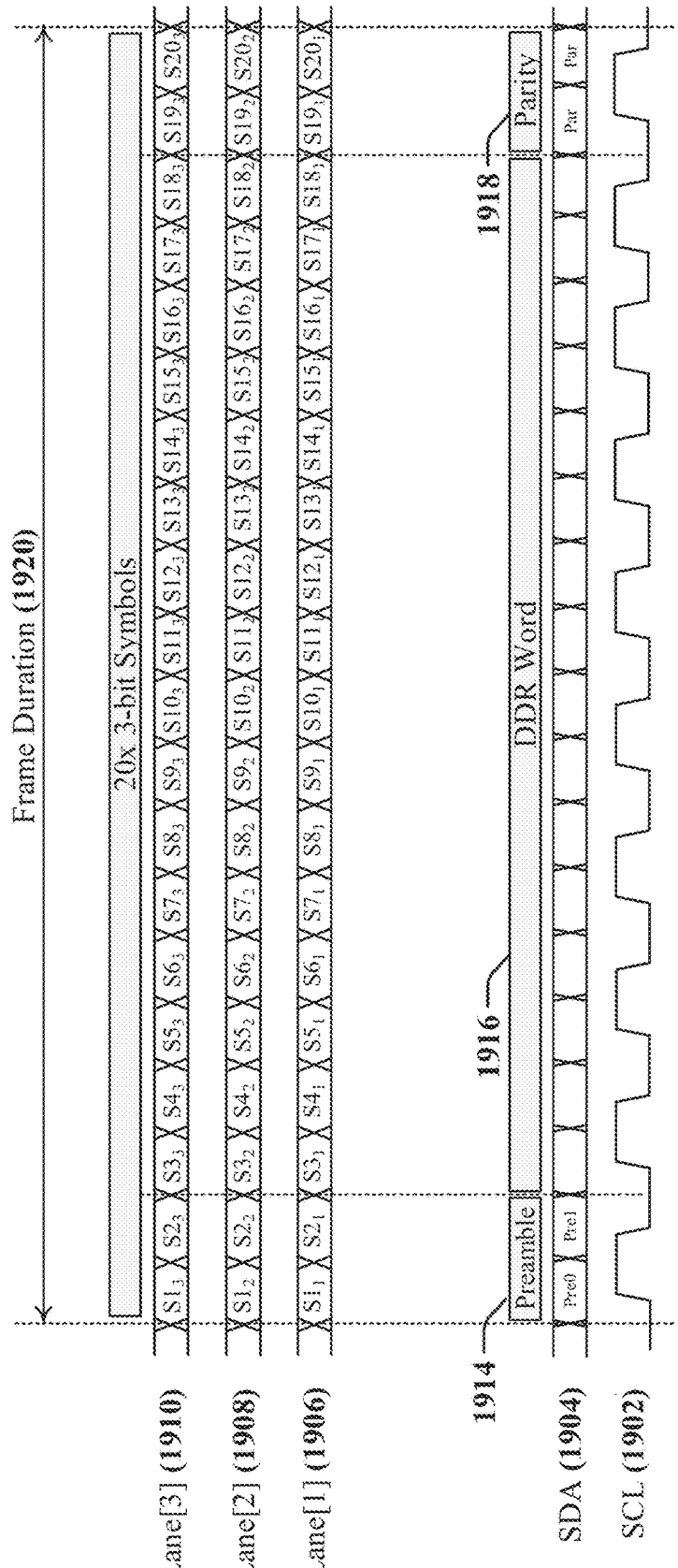
FIG. 19 illustrates transmissions over a multiline serial bus configured in a third mode according to certain aspects disclosed herein.

According to certain aspects of this disclosure, one or more additional wires data lanes may be configured to extend the encoding capability of the primary physical wires (SCL and SDA), and/or to provide one or more secondary channels for carrying additional data. FIG. 16 illustrates three examples 1600, 1620, 1640 of configurations of a multi-lane serial bus. The examples 1600, 1620, 1640 relate to a serial bus that has three available additional wires. Other combinations of wires and encoding may be provided in accordance with certain aspects disclosed herein. FIGS. 17-19 illustrate transmissions 1700, 1800, 1900 corresponding to each of the examples 1600, 1620, 1640.

In a first example 1600, the primary wires of the serial bus are operated in accordance with an I3C HDR-TSP, or HDR-TSL mode in which phase-differential signaling is transmitted on SCL 1702 and SDA 1704, and the three secondary wires 1706, 1708, 1710 carry phase-differential signals representative of three-bit symbols. In the illustrated example 1600, a command 1602 is transmitted in HDR-DDR mode to select between HDR-TSP and HDR-TSL modes for SCL 1702 and SDA 1704. In some instances, the command 1602 may carry additional parameters that define a mode of operation for the secondary wires 1706, 1708, 1710. In some instances, the mode of operation for the secondary wires 1706, 1708, 1710 may be defined in a separate command and/or by configuration information maintained by registers. The mode of operation may define the number of symbols transmitted in a frame, the number of wires used to transmit symbols, the type or mode of operation of drivers and/or receivers coupled to the serial bus, encoding scheme or mapping, numerical base used to represent transition numbers, and/or other characteristics or parameters.

In this first example 1600, primary data may be encoded in a number (J) of sequences of 2-bit symbols 1608 for transmission over the primary wires of the serial bus. The sequences of 2-bit symbols 1608 may include twelve symbols that are transmitted in 12 symbol slots 1720 in accordance with an internal transmitter clock derived from the source of the clock signal transmitted on SCL 1702 to control bus timing during transmission of the command 1602. In one example, the command 1602 is transmitted using 10 clock cycles 1604 of a 12.5 MHz clock signal, and each sequence of 12 symbols 1608 is transmitted in 6 clock cycles of the 12.5 MHz clock signal. Each symbol of the J sequences of 12 symbols 1608 carried on the primary wires is a two-bit symbol. In the example 1600, up to J of sequences of three-bit symbols 1606 may be transmitted on the secondary wires. Each symbol in the sequences of three-bit symbols 1606 may be transmitted in accordance with the internal transmitter clock derived from the source of the clock signal transmitted on SCL 1702 during transmission of the command 1602.

In a second example 1620, the primary and secondary wires are used to carry phase-differential signaling representative of five-bit symbols. In the second example 1620, a command 1622 is transmitted in HDR-DDR mode to select a phase-differential signaling mode for the serial bus. In some instances, the command 1622 may carry additional parameters that define the mode of operation for the serial bus. In some instances, the mode of operation for the serial bus may be defined in a separate command and/or by configuration information maintained by registers. The mode of operation may define the number of symbols transmitted in a frame, the number of wires used to transmit symbols, the type or mode of operation of drivers and/or receivers coupled to the serial bus, encoding scheme or mapping, numerical base used to represent transition numbers, and/or other characteristics or parameters.

In the second example 1620, primary data may be encoded in a number (K) of sequences of 5-bit symbols 1626 for transmission over the 5 wires 1802, 1804, 1806, 1808, 1810 of the serial bus. In one example, the sequences of 5-bit symbols 1626 may include n=12 symbols that are transmitted in 12 symbol slots defining a frame duration 1830 in accordance with an internal transmitter clock derived from the source of the clock signal transmitted on SCL 1802 to control bus timing during transmission of the command 1602. In another example, the sequences of 5-bit symbols 1626 may include n=6 symbols that are transmitted in accordance with an internal transmitter clock derived from the source of the clock signal transmitted on SCL 1802 to control bus timing during transmission of the command 1622, which may be transmitted using 10 clock pulses 1624.

The number of symbols transmitted in each sequence may be selected to provide a desired encoding rate representing the number of data bits per frame, a desired encoding efficiency that may be expressed as the ratio of the number bits encoded per frame to the maximum number of bits that can be encoded per frame and/or to obtain a satisfactory trade-off between encoding rate and encoding efficiency. The number of secondary bits and corresponding bits in each symbol may also vary. The transmission 1820 of FIG. 18 illustrates a serial bus with three wires 1822, 1824, 1826 configured to carry data encoded in sequences of 12 septenary symbols.

In a third example 1640, SCL 1902 and SDA 1904 of the serial bus are operated in accordance with an I3C HDR-DDR mode in which serialized data is transmitted on SDA 1904 on both edges of the clock signal transmitted on SCL 1902, and where the three secondary wires 1906, 1908, 1910 carry phase-differential signals representative of three-bit septenary symbols. In the third example 1640, a command 1642 is transmitted in HDR-DDR mode to select HDR-DDR mode for the primary wires. In some instances, the command 1642 may carry additional parameters that define a mode of operation for the secondary wires. In some instances, the mode of operation for the secondary wires may be defined in a separate command and/or by configuration information maintained by registers. The mode of operation may define the number of symbols transmitted in a frame, the number of wires used to transmit symbols, the type or mode of operation of drivers and/or receivers coupled to the serial bus, encoding scheme or mapping, numerical base used to represent transition numbers, and/or other characteristics or parameters.

In this third example 1640, primary data may be transmitted in L 20-bit frames based on timing provided by a set of 10 clock pulses 1644 transmitted on SCL 1902. The 20 bits include 16-bit payload data 1916, a two-bit preamble 1914 and two parity bits 1918. In one example, symbols are transmitted on the additional three wires based on the timing supplied by the set of 10 clock pulses 1644 and/or the frame duration 1920. In this example, data may be encoded in a number (L) of sequences of 3-bit symbols 1646 for transmission over the secondary wires 1906, 1908, 1910 to be transmitted concurrently with the frames of data transmitted on SDA 1904. An additional sequence of 3-bit symbols 1650 may be transmitted over the secondary wires 1906, 1908, 1910 concurrently with a frame of data 1654 carrying error checking or correction data on SDA 1904. The sequences of 3-bit symbols 1646, 1650 may include twenty symbols. In one example, the command 1642 is transmitted using 10 clock cycles of a 12.5 MHz clock signal, and each sequence of 20 symbols 1646, 1650 is transmitted in 10 clock cycles 1648, 1652 of the 12.5 MHz clock signal transmitted on SCL 1902. In a second example, each symbol in the sequences of three-bit symbols 1646, 1650 may be transmitted in accordance with a clock signal that is different from the clock signal transmitted SCL 1902.

According to certain aspects, signaling on the primary wires may be configured to avoid generation of certain data patterns defined by I3C HDR for indicating Restart, Exit, and/or in-band Reset. In some instances, the primary wires carry data in a mode prescribed by convention I3C protocols, including data transmitted in SDR, HDR-DDR, HDR-TSP and HDR-TSL modes. In these instances, a receiver clock signal may be extracted from signals transmitted on the SCL 1902 and SDA 1904 for use in capturing data transmitted on the secondary wires 1906, 1908, 1910. In some implementations, timing information extracted from the secondary wires 1906, 1908, 1910 may be used to provide a receive signal used to capture data from the secondary wires 1906, 1908, 1910. One or more receiver clock signals may be derived from timing information transmitted on any or all lanes.

According to certain aspects, the number of symbols transmitted in each frame may be selected to provide a desired encoding rate and/or encoding efficiency based on the number of additional lanes available for transmission and/or the timing information provided by signals transmitted on the primary wires.

In one example, three additional lanes may be used to support one of several variants of base-7 (septenary) coding. One of the more efficient variants configures symbols in groups of 20, which may be transmitted within 5 pulses on a signal transmitted on the SCL clock to transmit 7 bytes of data in 800 ns, when the primary lanes are operated in HDR-DDR data block format. The two primary lanes can transmit 2 bytes yielding 9 bytes per frame, or 72 bits in 800 ns, for an effective data rate of 90 Mbps. By way of comparison, the 3 additional lanes may be used to carry additional DDR-serialized data at 80 Mbps.

In another example, a single secondary lane may be used to enhance the throughput obtained using primary lanes encoded for HDR-TSL mode which can provide an effective rate of 33 Mbps. When the primary lanes are used to carry symbols, the secondary lane may be used to carry information in SDR mode, where one bit per equivalent clock is transmitted on the data lane to provide 6 bits for each 12-symbol frame (i.e. a 6-clock block) The six SDR bits may encode information related to error detection, error correction, and/or control for the current, the preceding and/or the succeeding block of symbols. The six SDR bits may be used to carry information in the opposite direction to the primary data lanes, where reverse information may include ACK/NACK, error detection/correction bits (e.g. the received parity bits) and/or indicators for timing parameters of the link. The six SDR bits may carry a combination of bits transmitted in both directions.

In another example, a single secondary lane may be used to enhance the throughput obtained using primary lanes, including in HDR-TSL mode which can provide an effective rate of 33 Mbps. When the primary lanes are used to carry symbols, the secondary lane may be used to carry information in HDR-DDR mode, where two bits per equivalent clock is transmitted on the data lane to provide 12 bits for each 12-symbol frame (i.e. a 6-clock block) The 12 additional bits may be used to carry an additional byte with 4 bits of control information. The control information may include information related to error detection, error correction, and/or control for the current, the preceding and/or the succeeding block of symbols. The 12 additional bits may be used to carry information in the opposite direction to the primary data lanes, where reverse information may include ACK/NACK, error detection/correction bits (e.g. the received parity bits) and/or indicators for timing parameters of the link. The 12 additional bits may carry a combination of bits transmitted in both directions. The resultant 3 bytes can be effectively transferred on 6 clocks of 80 ns each to provide a throughput of 50 Mbps. For comparison, 40 Mbps is achievable when tow data lanes are operated in accordance with the I3C HDR-DDR protocol.

In certain implementations, three secondary data lanes may be employed to carry phase-differential symbols coded in septenary numerals. Various configurations of encoding parameters are illustrated in table 2000 provided in FIG. 20. The table 2000 shows various coding modes for different numbers of slots 2002 available for transmitting symbols. The table illustrates from 1 to a maximum of 12 slots. While the table shows encoding for septenary transition numbers and is limited to a maximum of 12 slots, other numbers of transitions per symbol and maximum numbers of slots may be provided in certain applications. In the depicted example, a first configuration 2012 encodes data in group of four slots, which may be provided by two clock pulses. The first configuration 2012 can encode 11 binary bits 2004 (2.585 raw bits) for an encoding efficiency 2010 of 85.29%. The number of binary bits 2004 may define the maximum binary value 2006 that can be encoded. Three groups of four slots can be consolidated on a cadence of six clock pulses. Consequently, an effective transfer of 33 bits for 6 clock pulses can be accomplished in the first configuration 2012. In this example, 32 bits may be used for transferring 4 bytes of data, while the remaining bit can be used for error detection.

The first configuration 2012 provides an effective data throughput of 32 bits in 480 ns for a data rate of 66 Mbps. Combined with the two bytes encoded in ternary symbols transmitted on the primary lanes, 6 bytes of data may be transmitted for each six clock pulses (48 bits) in 480 ns to provide a throughput of 100 Mbps.

A second configuration 2014 can encode 33 binary bits 2004 for an encoding efficiency 2010 of 62.06%.

For comparison, an implementation that transmits ternary symbols on the primary lanes and two additional lanes, with a third lane used for carrying SDR or HDR-DDR data can provide a data throughput of 67 Mbps. This implementation, and other similar implementations may be used when devices lack the capability to coding and/or decode septenary symbols, or on systems that have only two additional data lanes.

Certain aspects disclosed herein permit increased data throughput while preserving the base architecture of an I3C interface. SDR, HDR-DDR and phase-differential symbol-based coding protocols. In some instances, receive clock signals may be recovered from the primary wires using circuits and modules implemented for conventional I3C protocols within the I3C HDR-TSP and HDR-TSL capable devices.

Figure 21:
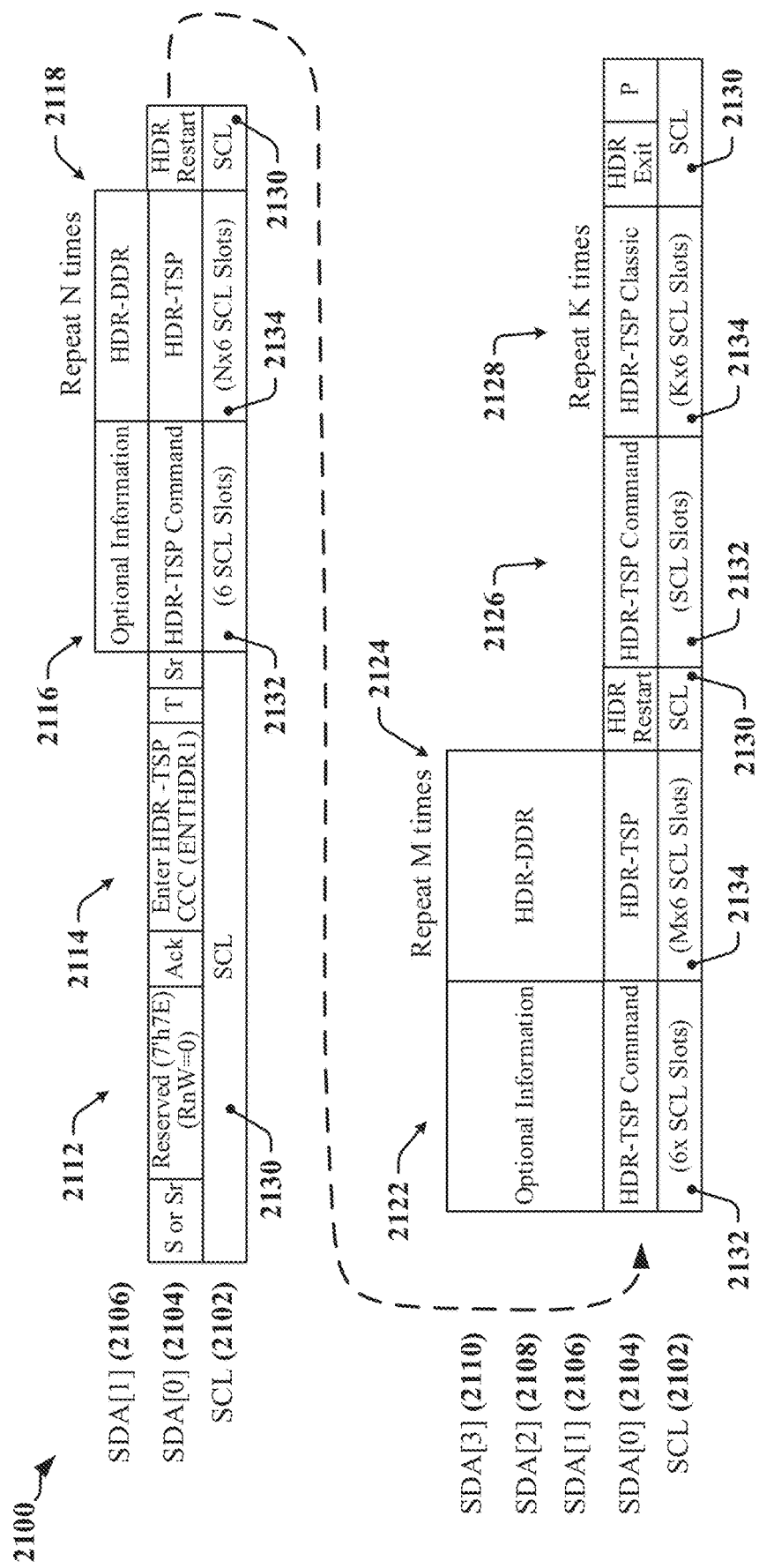
FIG. 21 illustrates dynamic configuration of multimode serial bus where primary lanes carry data encoded in symbols while one or more additional lanes are used for exchanging data in accordance with certain aspects disclosed herein.

FIG. 21 illustrates certain aspects related to the operation of a multilane serial bus operated in accordance with I3C protocols and where the primary lanes (SCL 2102 and SDA [0] 2104) carry data encoded in symbols while one or more additional lanes (SDA[1] 2106, SDA[2] 2108 and SDA[3] 2110) are usable for exchanging data in accordance with an I3C HDR-DDR protocol. The multilane configuration of the multilane serial bus may be dynamically switched between modes of operation and/or protocols. The number of data lanes used for data exchange, symbol bit-size, configuration of data blocks and/or the direction of data exchange over one or more additional lanes may be configured by command or configuration. In one example, the specific configuration of the multilane serial bus may be defined by command, or by a combination of command, mode and optional information, where at least some of the optional information and/or mode bits may be transmitted over one or more additional lanes. In another example, the configuration of the multilane serial bus may be defined by configuration information that defines bus width and transmission modes based on the devices involved in a transaction and/or the type of data exchange. In some implementations, the number of wires used by devices may be preconfigured during manufacture, assembly and/or system configuration. In at least some instances, commands may be transmitted to modify preconfigured definitions of bus width.

In the timeline 2100 in FIG. 21 the multilane serial bus may initially be configured for a mode of operation supported by all devices coupled to the I3C bus, which may be an SDR mode for example. In some implementations, the multilane serial bus may be configured for heterogenous use before a transaction is initiated. In one example, the heterogenous configuration is established before the transaction is initiated, such that the characteristics of each transfer block, including the identity of devices that are party to the transaction and the number of the additional data lanes are implicitly known when the transaction is initiated. In some implementations, one or more devices may be preconfigured with information that enable certain commands and/or transactions to implicitly configure, specify and/or activate additional data lanes for use during the transaction.

A first command sequence 2112, 2114 may include a common command code that causes one or more devices coupled to the I3C bus to be operated in HDR-TSP mode in which symbols are transmitted in the combined signaling state of SCL 2102 and SDA [0] 2104. In some instances, a second command 2116 may be transmitted that explicitly or implicitly configures the multilane serial bus and specifies a mode of communication. In the illustrated example, one additional lane is activated by the second command 2116, and SDA[1] 2106 is configured to carry information encoded in accordance with an HDR-DDR protocol. In the illustrated example, a first transaction 2118 is executed and includes transmission of a number (N) of 12-symbol sequences using SCL 2102 and SDA[0] 2104, while SDA[1] 2106 is operated in HDR-DDR mode.

A third command 2122 is transmitted in HDR-TSP mode to select a bus width and other parameters for a second transaction 2124 to be executed. In the illustrated example, the third command 2122 causes three additional lanes to be activated. In this example, three additional lanes are activated by the third command 2122, and SDA[1] 2106, SDA[2] 2108 and SDA[3] 2110 are activated to carry information encoded in accordance with an HDR-DDR protocol. In the illustrated example, the second transaction 2124 is executed and includes transmission of a number (M) of 12-symbol sequences using SCL 2102 and SDA[0] 2104, while SDA[1] 2106, SDA[2] 2108 and SDA[3] 2110 are operated in an HDR-DDR mode. Different HDR-DDR modes may be defined that configure blocks of data transmitted over SDA[1] 2106, SDA[2] 2108 and SDA[3] 2110. In one example, each data byte to be transmitted in HDR-DDR mode may be assigned to a single additional lane (SDA[1] 2106, SDA[2] 2108 and SDA[3] 2110). In another example, data may be striped across the additional lanes (SDA[1] 2106, SDA[2] 2108 and SDA[3] 2110).

A fourth command 2126 is transmitted in HDR-TSP mode to select a bus width and other parameters for a third transaction 2128 to be executed. In the illustrated example, the fourth command 2126 causes a conventional mode of HDR-TSP operation. Here, no additional lanes are used for a third transaction 2128 in which of a number (K) of 12-symbol sequences are transmitted using SCL 2102 and SDA[0] 2104.

SCL 2102 is unavailable for transmission of a clock signal in during transactions 2118, 2124 that use additional lanes to exchange information encoded using I3C HDR-DDR protocols. In these transactions, 2118, 2124 a receiver of data encoded using both HDR-TSP and HDR-DDR may use clock information provided transitions between HDR-TSP symbols to obtain a clock for processing HDR-DDR data signals. The receiver may include a clock recovery circuit that provides edges in a receive clock signal that are optimized to minimize the delay between transition detection and the edges.

In the illustrated timeline 2100, SCL 2102 switches between a mode 2130 in which it carries an I3C SDR clock signal and modes 2132, 2134 in which one or more sequences of 12 symbols are transmitted using 6 clock pulses on SCL 2102. When additional lanes are encoded using HDR-DDR protocols, 12 bits can be transmitted using the 6 clock pulses recovered from the received sequence of 12 HDR-TSP symbols. The two base lanes (SCL 2102 and SDA[0] 210) used for HDR-TSL can provide an effective rate of 33 Mbps. A single additional lane operated in accordance with an HDR-DDR protocol provide two bits per each clock cycle and 12 bits per 6-symbol sequence. The 12 bits may be used to carry one byte of data payload and 4 bits of control data. Information for error detection, error correction, and/or control for the following or previously transmitted data, may be sent by the transmitting device. The receiving device may send ACK/NACK information. Error detection/correction may be transmitted, including parity bits, as well as indicators used for timing parameters of the link.

The 3-byte transfer on 6 clocks of 80 ns each provides an effective throughput of 50 Mbps when base lanes carry HDR-TSP symbols and one additional lane is used for HDR-DDR data transmissions. When three additional lanes are available to carry HDR-DDR data, a total of 36 bits can be transmitted. By configuring the transmitted data blocks, 4 bytes of data can be transmitted using HDR-DDR for each 12-symbol transmission on the base lanes. Using this arrangement, a multilane, multimode serial bus can deliver a payload that includes 2 bytes from base HDR-TSP lanes and 4 bytes from three additional lanes bundled together and coded using HDR-DDR protocols. A total of 6 bytes maybe transmitted in 480 ns, yielding 100 Mbps effective data rate.

Figure 22:
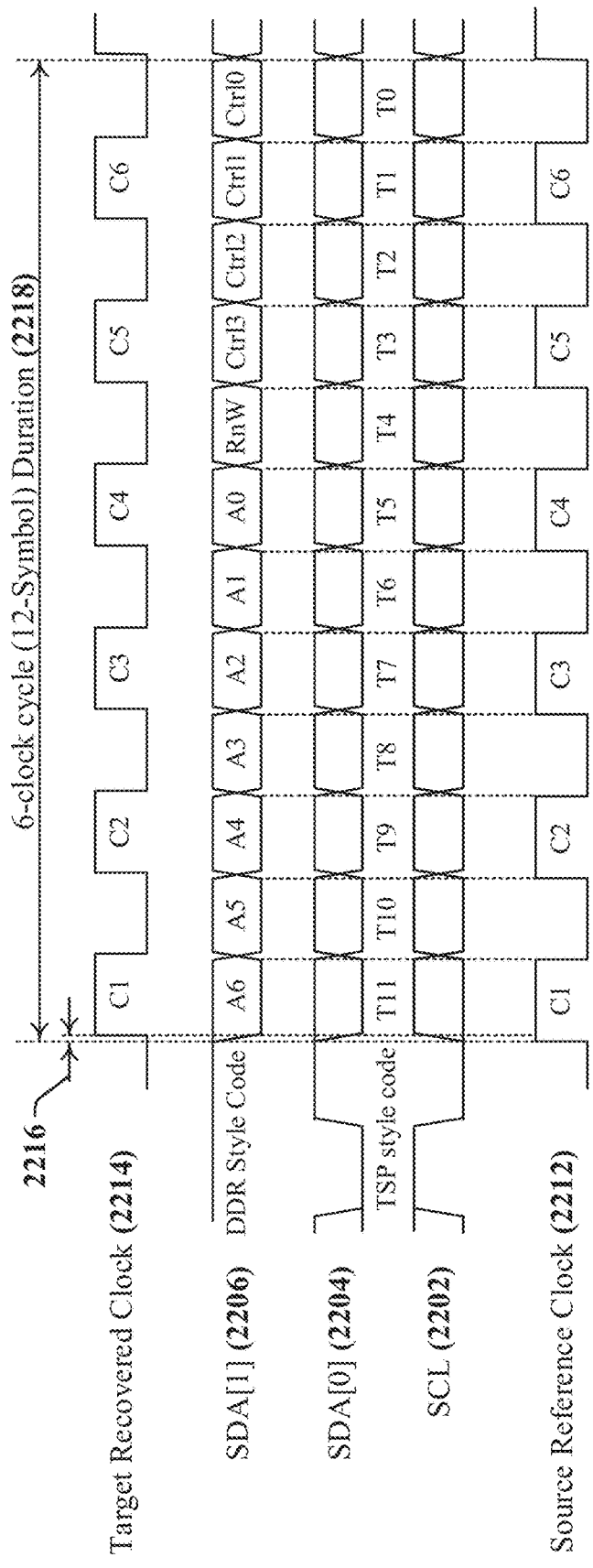
FIG. 22 illustrates a first example of transmission on a multimode serial bus in accordance with certain aspects disclosed herein.
Figure 23:
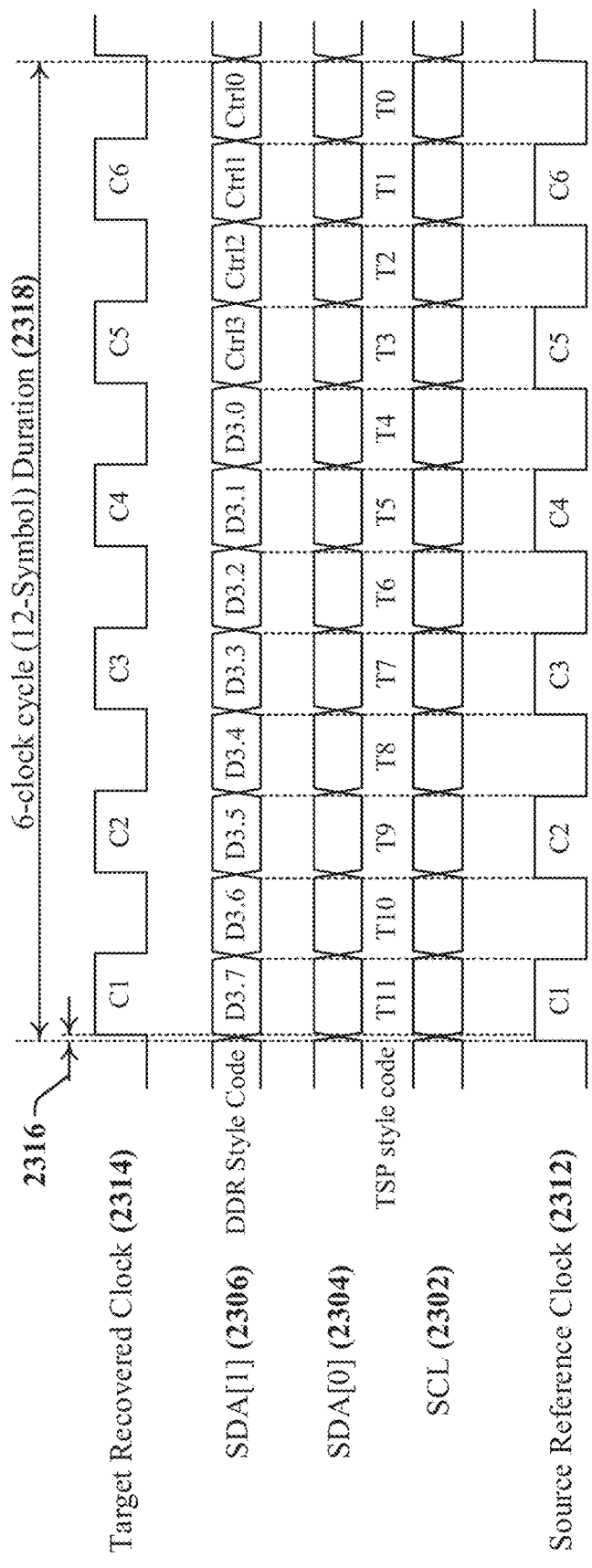
FIG. 23 illustrates a second example of transmission on a multimode serial bus in accordance with certain aspects disclosed herein.

FIGS. 22 and 23 illustrate first and second examples of transmissions 2200, 2300 on a multi-protocol multilane serial bus. A first example of a transmission 2200 provides a dual header used to configure a transaction that includes the example of a transmission 2300. The base lanes, SCL 2202 and SDA[0] 2204 are controlled by the sending device to initiate the HDR-TSP mode of transmission. In the following 12-symbol transmission period 2218, the base lanes may carry HDR-TSP encoded command and control information, while a first additional data lane (SDA[1] 2206) carries an HDR-DDR style command including address, read/write and control bits. The transmitting device typically uses an internal reference clock signal 2212 to time transmission of the symbols transmitted using SCL 2202 and SDA[0] 2204 and the HDR-DDR bits on SDA[1] 2206. A receiving device generates a recovered clock signal 2214 that it can use to capture symbol values from SCL 2202 and SDA[0] 2204 and the HDR-DDR bits from SDA[1] 2206. Some delay 2216 typically exists between the internal reference clock signal 2212 and the recovered clock signal 2214.

The second example of a transmission 2300 may provide a 3-byte data payload, where two bytes are encoded in HDR-TSP symbols transmitted using SCL 2302 and SDA[0] 2304, and one byte is transmitted on SDA[1] 2306 using HDR-DDR encoding. The transmitting device uses its internal reference clock signal 2312 to time transmission of the symbols transmitted using SCL 2302 and SDA[0] 2304 and the HDR-DDR bits transmitted on SDA[1] 2306. In one example, the payload may be transmitted in a frame that has a 6-clock cycle duration 2318. A receiving device generates a recovered clock signal 2314 that it can use to capture symbol values from SCL 2302 and SDA[0] 2304 and the HDR-DDR bits from SDA[1] 2306. In some instances, the multilane bus can be configured for full-duplex operation and the device that receives HDR-TSP symbols may use the recovered clock signal 2314 to transmit HDR-DDR bits over SDA[1] 2306. Some delay 2316 typically exists between the internal reference clock signal 2312 and the recovered clock signal 2314.

Figure 24:
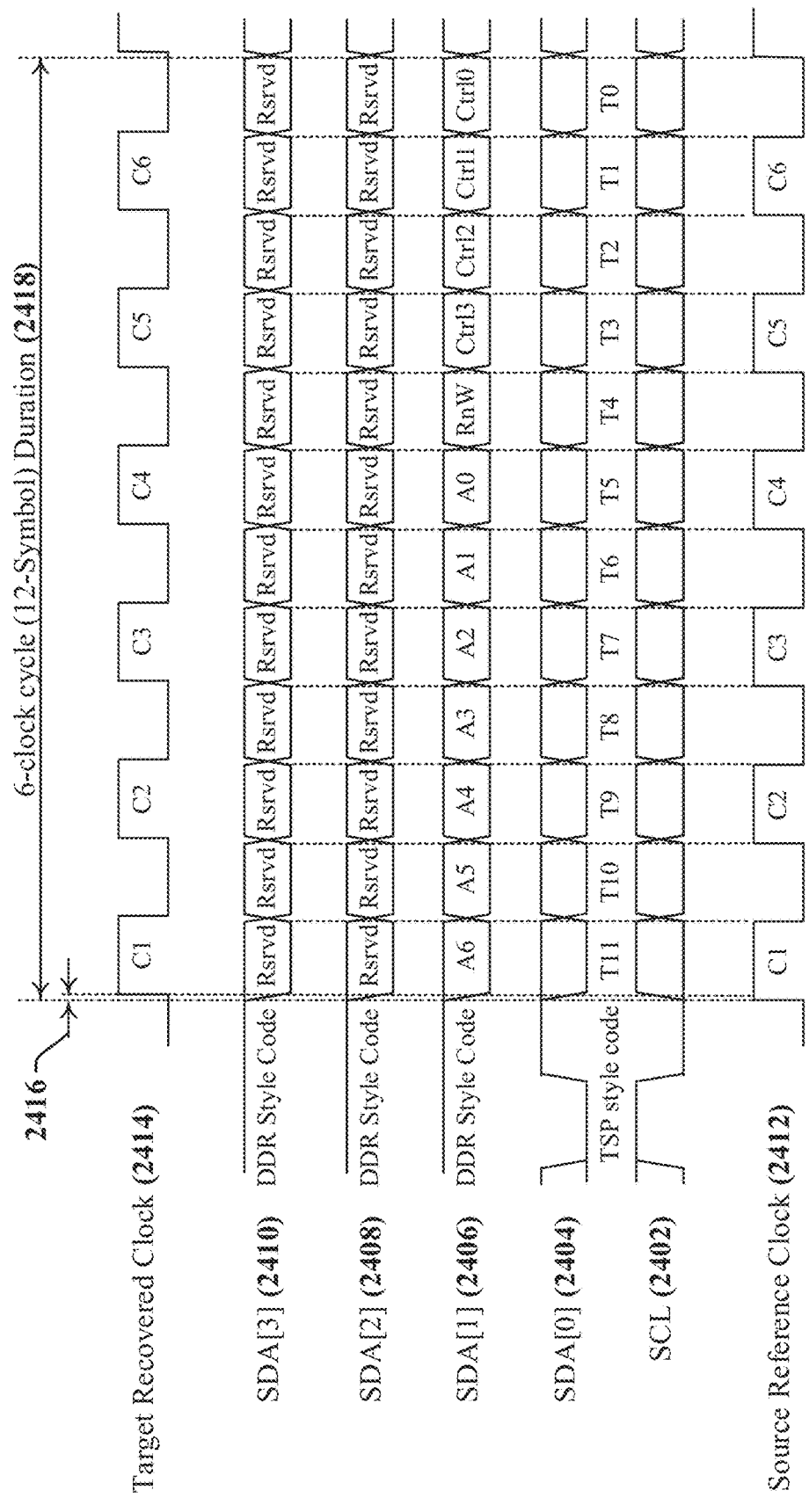
FIG. 24 illustrates a third example of transmission on a multimode serial bus in accordance with certain aspects disclosed herein.
Figure 25:
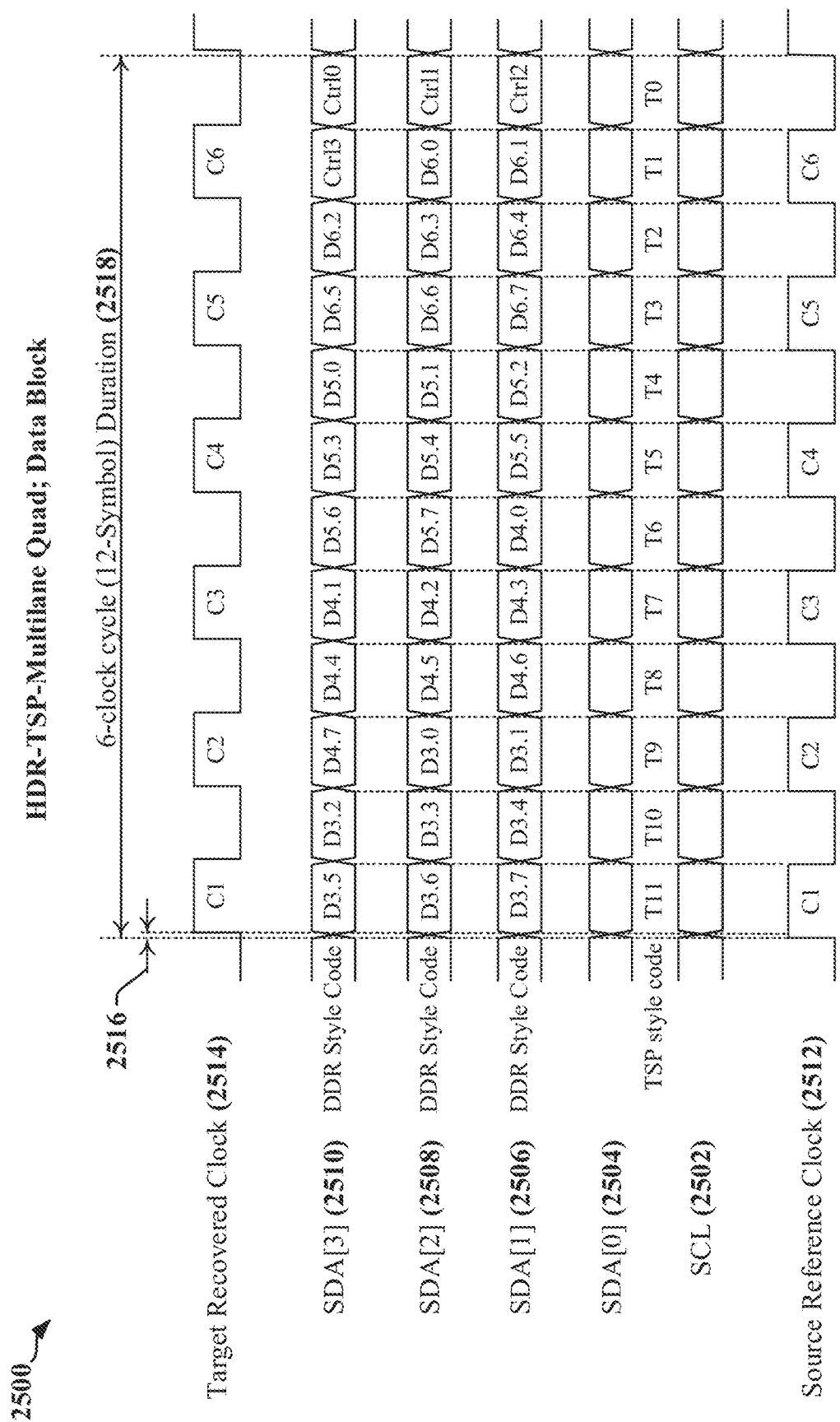
FIG. 25 illustrates a fourth example of transmission on a multimode serial bus in accordance with certain aspects disclosed herein.

FIGS. 24 and 25 illustrate third and fourth examples of transmissions 2400, 2500 on a multi-protocol multilane serial bus. Here, three additional lanes are active during payload transmission. The third example of a transmission 2400 provides a dual header used to configure a transaction that includes the fourth example of a transmission 2500. The base lanes, SCL 2402 and SDA[0] 2404 are controlled by the sending device to initiate the HDR-TSP mode of transmission. In the following 12-symbol transmission period 2418, the base lanes may carry HDR-TSP encoded command and control information, while a first additional data lane (SDA[1] 2406) carries an HDR-DDR style command including address, read/write and control bits. The other additional lanes (SDA[2] 2408 and SDA[3] 2410) may be idle during the header transmission, or may be used for carrying other command, control and/or configuration information. The transmitting device typically uses an internal reference clock signal 2412 to time transmission of the symbols transmitted using SCL 2402 and SDA[0] 2404 and the HDR-DDR bits on SDA[1] 2406. A receiving device generates a recovered clock signal 2414 that it can use to capture symbol values from SCL 2402 and SDA[0] 2404 and the HDR-DDR bits from SDA[1] 2406. In some instances, the recovered clock signal 2414 may be used to receive additional command, control and/or configuration information from SDA[2] 2408 and SDA[3] 2410 as indicated by configuration or command. Some delay 2416 typically exists between the internal reference clock signal 2412 and the recovered clock signal 2414.

The fourth example of a transmission 2500 illustrates the transmission of a 6-byte data payload in 6 clock cycles, where two bytes are encoded in HDR-TSP symbols transmitted using SCL 2502 and SDA[0] 2504, and four bytes are transmitted over SDA[1] 2506, SDA[2] 2508 and SDA[3] 2510 using HDR-DDR encoding. In the illustrated example, the four bytes are transmitted as a 32-bit group that is striped over SDA[1] 2506, SDA[2] 2508 and SDA[3] 2510. Other bit configurations may be defined or used for the transmission of a block of 3 or 4 HDR-DDR encoded bytes over SDA[1] 2506, SDA[2] 2508 and SDA[3] 2510. In some instances, striping is not used, and one byte may be transmitted per active lane. In other instances, two bytes may be striped over two additional lanes, with a third byte transmitted on a third additional lane. The latter example of partial striping may be used to support certain full-duplex implementations.

The transmitting device uses its internal reference clock signal 2512 to time transmission of the symbols transmitted using SCL 2502 and SDA[0] 2504 and the HDR-DDR bits transmitted on SDA[1] 2506, SDA[2] 2508 and SDA[3] 2510. In one example, the payload may be transmitted in a frame that has a 6-clock cycle duration 2518. A receiving device generates a recovered clock signal 2514 that it can use to capture symbol values from SCL 2502 and SDA[0] 2504 and the HDR-DDR bits from SDA[1] 2506, SDA[2] 2508 and SDA[3] 2510. In some instances, the multilane bus can be configured for full-duplex operation and the device that receives HDR-TSP symbols may use the recovered clock signal 2514 to transmit HDR-DDR bits over one or more of SDA[1] 2506, SDA[2] 2508 and SDA[3] 2510. Some delay 2516 typically exists between the internal reference clock signal 2512 and the recovered clock signal 2514.

Certain Additional Aspects of Multilane Configurations

Certain bus configurations can be based on generic coded lanes that use a first base lane as a clock carrier (e.g. SCL), and a second base lane for carrying data. In some implementations, additional data lanes may be used for data coding in a format consistent with base lane coding, including SDR or HDR-DDR in an I3C bus example. According to certain aspects disclosed herein, additional lanes may be used for carrying data using some combination of SDR, DDR and/or phase differential encoding, which uses n-base symbols defined for the number of wires for carrying signals.

Tables 1-9 below illustrate certain aspects of encoding schemes that may be used on additional lanes. The tables identify the base N, which is the is the power at which a number in a position needs to be raised. It is the position, from right to left, in the string of numerals written in that base-N. The base N value is the base number raised at the power of the rank. The 0 position is the first, i.e. N at the power of 0, always produces a value of 1. The 1 position is the immediately following to the left, hence N at the power of 1 gives N. The "Number of Transition Coefficients" defines the number of coefficients available in a numeral system. For example, in a ternary system, the coefficients {0, 1, 2} are available. The Total Value shows the largest number that can be written using all the ranks in the level. So, for rank 1 in base-10 we can write $9 \times 10^0 + 9 \times 10^1 = 9 \times 1 + 9 \times 10 = 99$. Hex is the total number written in HEX. For example, 99 decimal is 36 Hexadecimal ($3 \times 16^0 + 6 \times 16^1 = 3 + 96 = 99$).

In various aspects, the clock signal transported on the SCL lane can be used to recover data from lanes carrying phase-differential symbols. Clock information embedded in transitions between symbols may also be recovered and used for data recovery. The availability of clock information from two regions of signals can enhance signal integrity procedures.

In some implementations, three additional lanes may be available for data transport. The base lanes may be operated in an I3C SDR mode or an I3C HDR-DDR mode. In one example, the additional data lanes may be encoded to support transmission of data over two lanes in ternary symbols, and using SDR or DDR encoding for the third lane. In another example, data may be encoded in ternary symbols transmitted over all three lanes.

In examples where the base lanes operate in accordance with an I3C SDR protocol, which has a 9-SCL clock period cadence, additional lanes may preserve the 9-clock frame per data block. Tables 1 and 2 below relate to an example in which two of the three additional lanes are used for ternary symbol encoding.

TABLE 1

| Rank base 3 | Base 3 value | Number of Transition Coefficients | Total value | Hex | Base 3 Slots | Bits covered | Max Binary | Bits per Ternary | Data Channel usage |
| --- | --- | --- | --- | --- | --- | --- | --- | --- | --- |
| 5 | 243 | 3 | 728 | 2D8 | 6 | 9.507795 | 511 | 1.5 | 70.19% |

In Table 1, all nine SCL clock periods are used for additional data transfer, then one of the most efficient grouping of symbols is to transmit 3 sets of six ternary symbols, each set transmitted across three SCL clock periods. This arrangement provides 9 bits in each of 3 sets of symbols for 27 additional bits per frame, which include 3 full additional bytes.

In Table 4, eight of the nine SCL clock periods are used for additional data transfer, and the ninth bit may be used as a control bit as defined by the on I3C SDR protocol that controls transmission on the two base lanes. When eight of the nine SCL clock periods are used for additional data transfer, then one of the most efficient grouping of the symbols encodes data in four sets of four septenary symbols,

TABLE 2

| Rank base 3 | Base 3 value | Number of Transition Coefficients | Total value | Hex | Base 3 Slots | Bits covered | Max Binary | Bits per Ternary | Data Channel usage |
|---|---|---|---|---|---|---|---|---|---|
| 3 | 27 | 3 | 80 | 50 | 4 | 6.321928 | 63 | 1.5 | 78.75% |

In Table 2, eight of the nine SCL clock periods are used for additional data transfer, and the ninth bit may be used as a control bit as defined by the on I3C SDR protocol that controls transmission on the two base lanes. One of the most efficient grouping of symbols in this example involves four sets of four ternary symbols, each set transmitted across two SCL clock periods. This arrangement provides 6 bits in each of the four sets of symbols for 24 additional bits, or 3 bytes per frame.

As illustrated in the examples corresponding to Tables 1 and 2, a two lane plus one lane arrangement can deliver a total of 5 bytes per frame, including one byte encoded for SDR transmission over the base lane, 3 bytes encoded in two ternary encoded lanes, and one byte encoded for SDR transmission over the third additional lane. This latter configuration can provide a 50 Mbps effective data rate. Increased throughput may be obtained by encoding data for DDR transmission over the third additional lane, thereby obtaining an additional byte per frame, for a total of 6 bytes per frame which may yield a 60 Mbps effective data rate. In these examples, the additional data lanes may carry any type of data, including control, error detection and/or error correction information.

Tables 3 and 4 below relate to an example in which the three additional lanes are used for base-7 (septenary) symbol encoding while the base lane is encoded for SDR transmissions.

each set transmitted across two SCL clock periods. This configuration provides 11 bits in each of the 4 sets symbols to provide a total of 44 additional bits per frame. In this example, 5 additional bytes may be transmitted per frame.

As illustrated in the example corresponding to Table 3, a three lane septenary-encoded arrangement can deliver a total of 7 bytes per frame, including one byte encoded for SDR transmission over the base lane and 6 bytes encoded in two ternary encoded lanes. This latter configuration can provide a 70 Mbps effective data rate. As illustrated in the example corresponding to Table 4, a three lane septenary-encoded arrangement can deliver a total of 6 bytes per frame, including one byte encoded for SDR transmission over the base lane and 5 bytes encoded in two ternary encoded lanes. This latter configuration can provide a 60 Mbps effective data rate.

Increased throughput may be obtained by encoding data for DDR transmission over the third additional lane, thereby obtaining an additional byte per frame, for a total of 6 bytes per frame which may yield a 60 Mbps effective data rate. In these examples, the additional data lanes may carry any type of data, including control, error detection and/or error correction information.

TABLE 3

| Rank base 7 | B-7 value | Number of Transition Coefficients | Total value | Hex | B-7 Slots | Bits covered | Max Binary | Bits per base 7 | Data Channel usage |
|---|---|---|---|---|---|---|---|---|---|
| 5 | 16807 | 7 | 117648 | 1CB90 | 6 | 16.84412 | 65535 | 2.666667 | 55.70% |

When all nine SCL clock periods are used for additional data transfer, then one of the most efficient grouping of the symbols encodes data in three sets of six septenary symbols, each set transmitted across three SCL clock periods. This configuration provides 16 bits in each of the 3 sets symbols to provide a total of 48 additional bits per frame. In this example, 6 additional bytes may be transmitted per frame.

In examples where the base lanes operate in accordance with an I3C DDR protocol, which has a 10-SCL clock period cadence, additional lanes may preserve the 10-clock frame per data block. Tables 5 and 6 below relate to an example in which two of the three additional lanes are used for ternary symbol encoding.

TABLE 4

| Rank base 7 | Base 7 value | Number of Transition Coefficients | Total value | Hex | Base 7 Slots | Bits covered | Max Binary | Bits per base 7 | Data Channel usage |
|---|---|---|---|---|---|---|---|---|---|
| 3 | 343 | 7 | 2400 | 960 | 4 | 11.22882 | 2047 | 2.75 | 85.29% |

TABLE 5

| Rank base 3 | Base 3 value | Number of Transition Coefficients | Total value | Hex | Base 3 Slots | Bits covered | Max Binary | Bits per Ternary | Data Channel usage |
|---|---|---|---|---|---|---|---|---|---|
| 9 | 19683 | 3 | 59048 | E6A8 | 10 | 15.8496 | 32767 | 1.5 | 55.49% |

When all ten SCL clock periods are used for additional data transfer, then one of the most efficient grouping of the symbols encodes data in two sets of 10 ternary symbols, each set transmitted across three SCL clock periods. This configuration provides 15 bits in each of the 2 sets symbols to provide a total of 30 bits, or 3 full bytes.

TABLE 6

| Rank base 3 | Base 3 value | Number of Transition Coefficients | Total value | Hex | Base 3 Slots | Bits covered | Max Binary | Bits per Ternary | Data Channel usage |
|---|---|---|---|---|---|---|---|---|---|
| 3 | 27 | 3 | 80 | 50 | 4 | 6.321928 | 63 | 1.5 | 78.75% |

In Table 6, eight of the ten SCL clock periods are used for additional data transfer, and the ninth and tenth bits may be used as a control bit as defined by the on I3C DDR protocol that controls transmission on the two base lanes. One of the most efficient grouping of symbols in this example involves four sets of four ternary symbols, each set transmitted across two SCL clock periods. This arrangement provides 6 bits in each of the four sets of symbols for 24 additional bits, or 3 bytes per frame.

As illustrated in the examples corresponding to Tables 5 and 6, a two lane plus one lane arrangement can deliver a total of 6 bytes per frame, including two bytes encoded for DDR transmission over the base lane, 3 bytes encoded in two ternary encoded lanes, and one byte encoded for SDR transmission over the third additional lane. This latter configuration can provide a 60 Mbps effective data rate. Increased throughput may be obtained by encoding data for DDR transmission over the third additional lane, thereby obtaining an additional byte per frame, for a total of 7 bytes per frame which may yield a 70 Mbps effective data rate. In these examples, the additional data lanes may carry any type of data, including control, error detection and/or error correction information.

Tables 3 and 4 below relate to an example in which the three additional lanes are used for base-7 (septenary) symbol encoding while the base lane is encoded for DDR transmissions.

TABLE 7

| Rank B-7 | Base 7 value | No. of Trans. Coeffs. | Total value | Hex | B-7 Slots | Bits covered | Max Binary | Bits per B-7 | Data Chan. usage |
|---|---|---|---|---|---|---|---|---|---|
| 9 | 40353607 | 7 | 2.82E+08 | 10D63AF0 | 10 | 28.07355 | 268435455 | 2.8 | 95.03% |

Referring to Table 7, when all ten SCL clock periods are used for additional data transfer, then one of the most efficient grouping of the symbols encodes data in two sets of 10 ternary symbols, each set transmitted across five SCL clock periods. This configuration provides 28 bits in each of the 2 sets symbols to provide a total of 56 bits, or 7 full bytes.

TABLE 8

| Rank base 7 | Base 7 value | Number of Transition Coefficients | Total value | Hex | Base 7 Slots | Bits covered | Max Binary | Bits per base 7 | Data Channel usage |
|---|---|---|---|---|---|---|---|---|---|
| 3 | 343 | 7 | 2400 | 960 | 4 | 11.22882 | 2047 | 2.75 | 85.29% |

In Table 8, eight of the ten SCL clock periods are used for additional data transfer, and the ninth and tenth bits may be used as a control bit as defined by the on I3C DDR protocol that controls transmission on the two base lanes. One of the most efficient grouping of symbols in this example involves four sets of four ternary symbols, each set transmitted across two SCL clock periods. This arrangement provides 11 bits in each of the four sets of symbols for 44 additional bits, or 5 bytes per frame As illustrated in the example corresponding to Table 7, a three lane septenary-encoded arrangement can deliver a total of 9 bytes per frame, including two bytes encoded for DDR transmission over the base lane and 7 bytes encoded in two ternary encoded lanes. This latter configuration can provide a 90 Mbps effective data rate. As illustrated in the example corresponding to Table 8, a three lane septenary-encoded arrangement can deliver a total of 7 bytes per frame, including two bytes encoded for DDR transmission over the base lane and 5 bytes encoded in two ternary encoded lanes. This latter configuration can provide a 70 Mbps effective data rate.

Certain bus configurations can be based on generic coded lanes that use the first and second base lane for carrying data encoded using phase differential symbols. In I3C HDR-TSP mode, the two base lanes are coded in ternary symbols and the data block has 6 SCL clock periods that carry 12 ternary symbols. In various implementations disclosed herein, the additional data lanes keep the 6 SCL clock period frame format.

According to certain aspects disclosed herein, each of the additional data lanes may carry 12 bits using the six SCL clock period in an I3C HDR-TSP data block. When the data from the three additional lanes is aggregated, 36 bits, or 4 full bytes can be carried in the data frame. In one example, this configuration can deliver a total of 6 bytes per frame, including 2 bytes from base HDR-TSP and 4 bytes from the aggregated additional lanes, yielding a 100 Mbps effective data rate.

Table 9 illustrates an encoding example when the additional data lanes carry data encoded in septenary symbols using the six SCL clock periods in an I3C HDR-TSP data block.

In another example, two additional lanes may be used to carry ternary symbols with a third additional lane carrying DDR encoded data. This configuration can deliver a total of 5 bytes per frame, including two bytes from the base lanes HDR-TSP, two ternary encoded bytes from two additional lanes and one DDR encoded byte from the third additional lane. This configuration yields an 83 Mbps effective data rate, with 6 bits available per frame for control information. If the t 6 bits are included, the effective data and control rate is 100 Mbps. In another example, the third additional data lane may be encoded for SDR transmission, carrying six bits of control data. In this example, the overall data throughput, bit is 40 bits per frame (data and control), yielding an 83 Mbps effective data and control rate.

Examples of Processing Circuits and Methods

Figure 26:
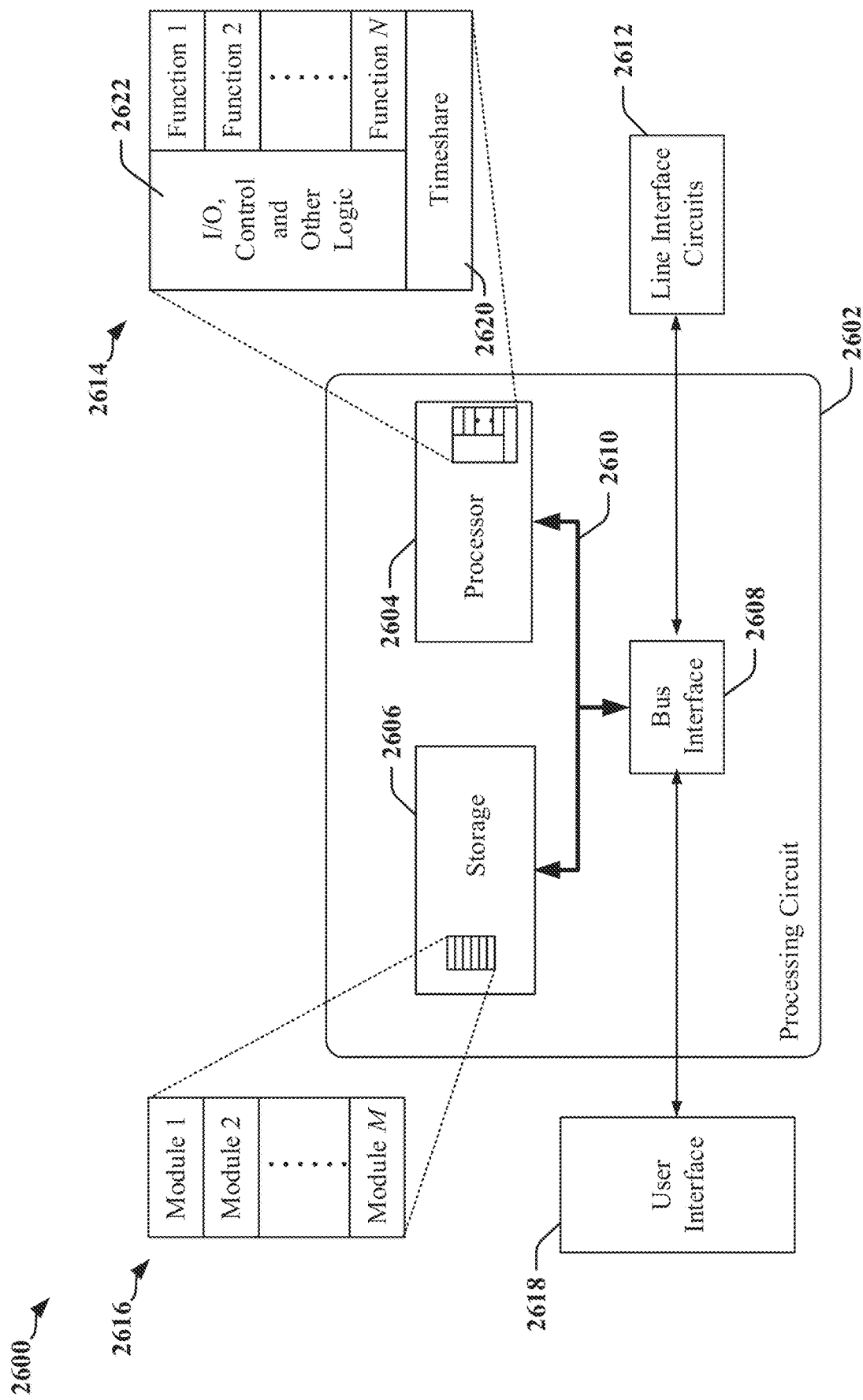
FIG. 26 is a block diagram illustrating an example of an apparatus employing a processing circuit that may be adapted according to certain aspects disclosed herein.

FIG. 26 is a diagram illustrating an example of a hardware implementation for an apparatus 2600 employing a processing circuit 2602 that may be configured to perform one or more functions disclosed herein. In accordance with various aspects of the disclosure, an element, or any portion of an element, or any combination of elements as disclosed herein may be implemented using the processing circuit 2602. The processing circuit 2602 may include one or more processors 2604 that are controlled by some combination of hardware and software modules. Examples of processors 2604 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 2604 may include specialized processors that perform specific functions, and that may be configured, augmented or controlled by one of the software modules 2616. The one or more processors 2604 may be configured through a combination of software modules 2616 loaded during initialization, and further configured by loading or unloading one or more software modules 2616 during operation. In various examples, the processing circuit 2602 may be implemented using a state machine, sequencer, signal processor and/or general-purpose processor, or a combination of such devices and circuits.

TABLE 9

| Rank base 7 | Base 7 value | Number of Transition Coefficients | Total value | Hex | Base 7 Slots | Bits covered | Max Binary | Bits per base 7 | Data Channel usage |
|---|---|---|---|---|---|---|---|---|---|
| 3 | 343 | 6 | 2400 | 960 | 4 | 11.22882 | 2047 | 2.75 | 85.29% |

In the example related to Table 9, one of the most efficient grouping of the symbols provides three sets of four septenary symbols, each set occupying two SCL clock periods. This configuration encodes 11 bits per set of symbols and provides for encoding 33 additional, or 4 full additional bytes. This latter configuration can provide a 100 Mbps effective data rate (including the 2 bytes encoded in the base lanes) for an 80 ns symbol period.

In the illustrated example, the processing circuit 2602 may be implemented with a bus architecture, represented generally by the bus 2610. The bus 2610 may include any number of interconnecting buses and bridges depending on the specific application of the processing circuit 2602 and the overall design constraints. The bus 2610 links together various circuits including the one or more processors 2604, and storage 2606. Storage 2606 may include memory devices and mass storage devices, and may be referred to herein as computer-readable media and/or processor-readable media. The bus 2610 may also link various other circuits such as timing sources, timers, peripherals, voltage regulators, and power management circuits. A bus interface 2608 may provide an interface between the bus 2610 and one or more transceivers 2612. A transceiver 2612 may be provided for each networking technology supported by the processing circuit. In some instances, multiple networking technologies may share some or all of the circuitry or processing modules found in a transceiver 2612. Each transceiver 2612 provides a means for communicating with various other apparatus over a transmission medium. Depending upon the nature of the apparatus 2600, a user interface 2618 (e.g., keypad, display, speaker, microphone, joystick) may also be provided, and may be communicatively coupled to the bus 2610 directly or through the bus interface 2608.

A processor 2604 may be responsible for managing the bus 2610 and for general processing that may include the execution of software stored in a computer-readable medium that may include the storage 2606. In this respect, the processing circuit 2602, including the processor 2604, may be used to implement any of the methods, functions and techniques disclosed herein. The storage 2606 may be used for storing data that is manipulated by the processor 2604 when executing software, and the software may be configured to implement any one of the methods disclosed herein.

One or more processors 2604 in the processing circuit 2602 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 2606 or in an external computer-readable medium. The external computer-readable medium and/or storage 2606 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 2606 may also include, by way of example, a carrier wave, a transmission line, and any other suitable medium for transmitting software and/or instructions that may be accessed and read by a computer. Computer-readable medium and/or the storage 2606 may reside in the processing circuit 2602, in the processor 2604, external to the processing circuit 2602, or be distributed across multiple entities including the processing circuit 2602. The computer-readable medium and/or storage 2606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 2606 may maintain software maintained and/or organized in loadable code segments, modules, applications, programs, etc., which may be referred to herein as software modules 2616. Each of the software modules 2616 may include instructions and data that, when installed or loaded on the processing circuit 2602 and executed by the one or more processors 2604, contribute to a run-time image 2614 that controls the operation of the one or more processors 2604. When executed, certain instructions may cause the processing circuit 2602 to perform functions in accordance with certain methods, algorithms and processes described herein.

Some of the software modules 2616 may be loaded during initialization of the processing circuit 2602, and these software modules 2616 may configure the processing circuit 2602 to enable performance of the various functions disclosed herein. For example, some software modules 2616 may configure internal devices and/or logic circuits 2622 of the processor 2604, and may manage access to external devices such as the transceiver 2612, the bus interface 2608, the user interface 2618, timers, mathematical coprocessors, and so on. The software modules 2616 may include a control program and/or an operating system that interacts with interrupt handlers and device drivers, and that controls access to various resources provided by the processing circuit 2602. The resources may include memory, processing time, access to the transceiver 2612, the user interface 2618, and so on.

One or more processors 2604 of the processing circuit 2602 may be multifunctional, whereby some of the software modules 2616 are loaded and configured to perform different functions or different instances of the same function. The one or more processors 2604 may additionally be adapted to manage background tasks initiated in response to inputs from the user interface 2618, the transceiver 2612, and device drivers, for example. To support the performance of multiple functions, the one or more processors 2604 may be configured to provide a multitasking environment, whereby each of a plurality of functions is implemented as a set of tasks serviced by the one or more processors 2604 as needed or desired. In one example, the multitasking environment may be implemented using a timesharing program 2620 that passes control of a processor 2604 between different tasks, whereby each task returns control of the one or more processors 2604 to the timesharing program 2620 upon completion of any outstanding operations and/or in response to an input such as an interrupt. When a task has control of the one or more processors 2604, the processing circuit is effectively specialized for the purposes addressed by the function associated with the controlling task. The timesharing program 2620 may include an operating system, a main loop that transfers control on a round-robin basis, a function that allocates control of the one or more processors 2604 in accordance with a prioritization of the functions, and/or an interrupt driven main loop that responds to external events by providing control of the one or more processors 2604 to a handling function.

Figure 27:
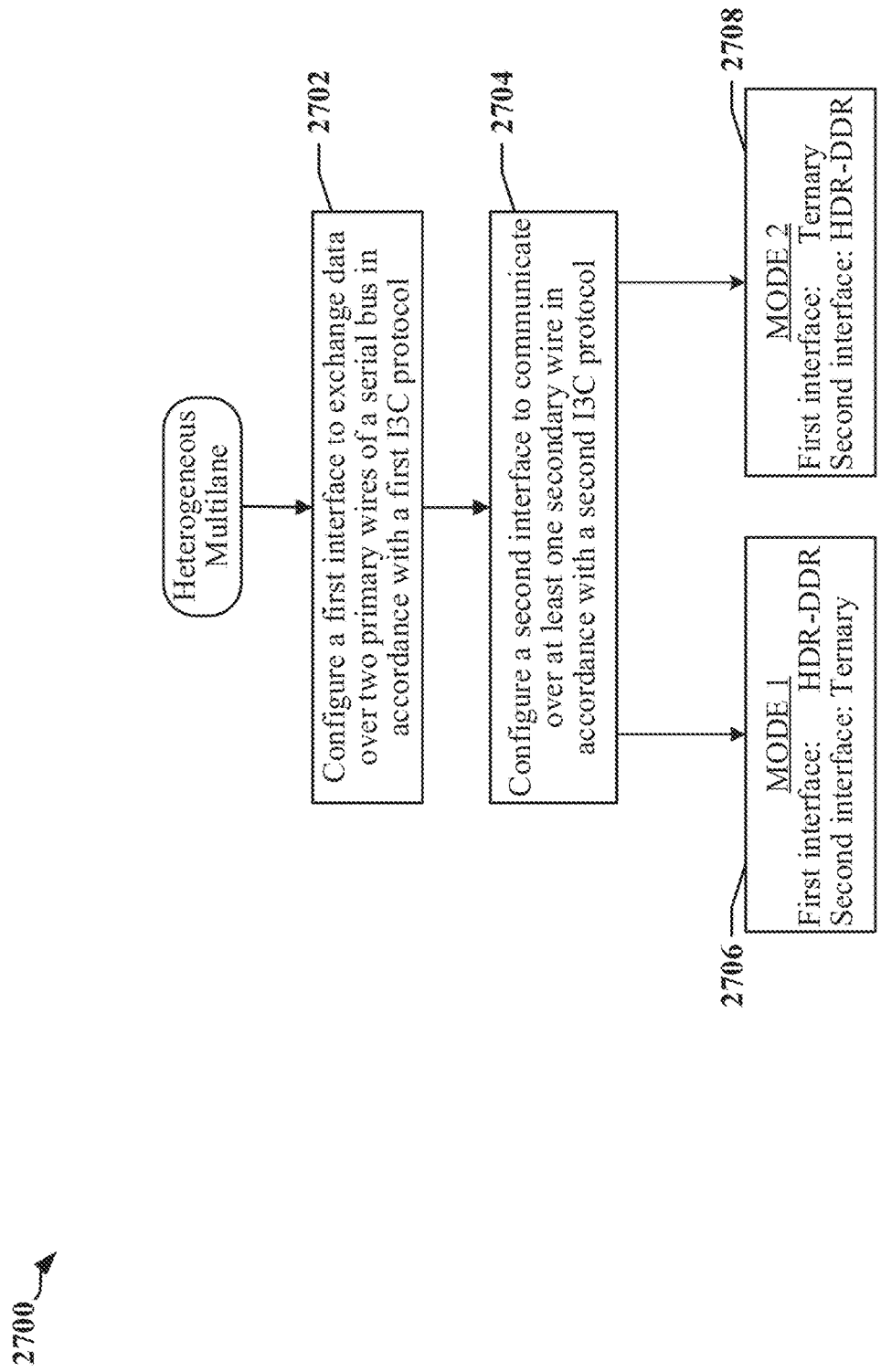
FIG. 27 is a flowchart illustrating a process that may be performed at a sending device coupled to a serial bus in accordance with certain aspects disclosed herein.

FIG. 27 is a flowchart 2700 illustrating a method of data communication that may be performed at a device coupled to a serial bus. At block 2702, the device may configure a first interface to exchange data over two primary wires of a serial bus in accordance with a first I3C protocol. At block 2704, the device may configure a second interface to communicate over at least one secondary wire in accordance with a second I3C protocol. In one mode 2706, the device configures the first interface to operate in accordance with an HDR-DDR protocol, and the device configures the second interface to use ternary symbol encoding. In another mode 2708, the device configures the first interface to use ternary symbol encoding, and the device configures the second interface to operate in accordance with an HDR-DDR protocol.

In one example, the device may transmit the first data over the two primary wires in accordance with a double data rate protocol. The device may encode the second data in a plurality of symbols. Each symbol includes bits that represent signaling state of at least two secondary wires during transmission of the symbol. The device may transmit the plurality of symbols over the at least two secondary wires.

In another example, the device may encode the first data in a sequence of symbols. Each symbol in the sequence of symbols includes bits that represent signaling state of the two primary wires.

In another example, the device may decode the first data from a sequence of symbols received from the two primary wires. Each symbol in the sequence of symbols includes bits that represent signaling state of the two primary wires during a symbol transmission interval. The device may provide a recovered clock signal that includes an edge corresponding to each transition between symbol transmission intervals. In some instances, the device may use the recovered clock signal to receive the second data when the second data is encoded according to a double data rate protocol. In other instances, the device may use the recovered clock signal to transmit the second data over the at least one secondary wire in accordance with a double data rate protocol.

In some implementations, a device that receives the sequence of symbols from the two primary wires may use the recovered clock signal to control transmission of information over one or more secondary wires. In a first example, one or more words may be ternary or DDR encoded after each data block, and transmitted during a next data block to provide signal integrity data, such as a cyclic redundancy check value, a checksum, part of the previously transferred data word, or other information that can certify some quantity of transmitted data (e.g. certification of each data word or multiple data words). In some examples, feedback generated from decoded ternary values, and/or symbols received from the primary interface can be transmitted over an additional data wire to maximize or optimize data throughput of the primary interface while providing high-resolution confirmation from the receiver that data has been received without error.

In a first example, the clock signal recovered from the forward, primary wires may be used to implement a full-duplex communication link Data may be DDR encoded in accordance with timing provided by the recovered clock signal, and the DDR-encoded data may be transmitted in the reverse direction over one or more additional wires without an accompanying clock signal. The transmitter of the sequence of symbols may capture the DDR-encoded data using the internal clock signal (or a derivative) used to control transmission of the sequence of symbols.

In some implementations, the device may exchange the second data in accordance with a double data rate protocol. The device may exchange the second data using at least two secondary wires. Each byte of the second data may be exchanged using the at least two secondary wires.

In various examples, the configuration of symbols defines a number of bits in symbols transmitted using the plurality of secondary wires. The configuration of symbols may define a number of symbols to be transmitted concurrently with a frame transmitted on the two primary wires. The configuration of symbols may define a number of groups of symbols to be transmitted concurrently with a frame transmitted on the two primary wires. The first I3C protocol may be a double data rate protocol and twenty symbols are to be transmitted concurrently with a frame transmitted on the two primary wires. The first I3C protocol may be a high data rate protocol in which data is communicated in ternary symbols over the two primary wires of the serial bus. Twelve symbols may be transmitted concurrently with a frame transmitted on the two primary wires. The twelve symbols may be transmitted in groups of four symbols.

In one example, twenty symbols are transmitted concurrently with a frame transmitted on the two primary wires, where the twenty symbols are transmitted in groups of ten symbols. In another example, eighteen symbols are transmitted concurrently with a frame transmitted on the two primary wires, where the eighteen symbols are transmitted in groups of six symbols. In another example, sixteen symbols are transmitted concurrently with a frame transmitted on the two primary wires, where the sixteen symbols are transmitted in groups of four symbols.

Figure 28:
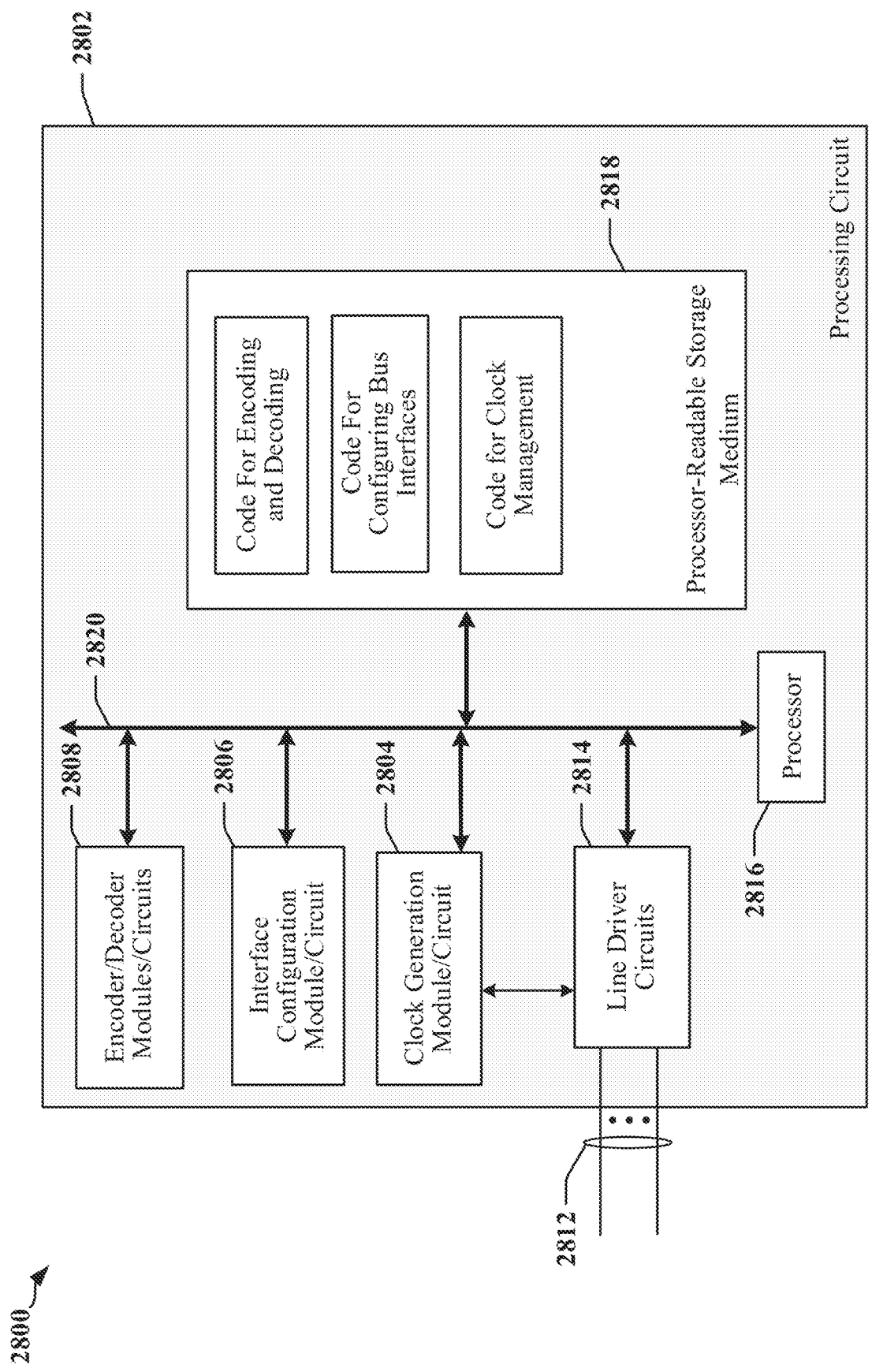
FIG. 28 illustrates a hardware implementation for a transmitting apparatus adapted to respond to support multi-lane operation of a serial bus in accordance with certain aspects disclosed herein.

FIG. 28 is a diagram illustrating a simplified example of a hardware implementation for an apparatus 2800 employing a processing circuit 2802. The processing circuit 2802 typically has a controller or processor 2816 that may include one or more microprocessors, microcontrollers, digital signal processors, sequencers and/or state machines. The processing circuit 2802 may be implemented with a bus architecture, represented generally by the bus 2820. The bus 2820 may include any number of interconnecting buses and bridges depending on the specific application of the processing circuit 2802 and the overall design constraints. The bus 2820 links together various circuits including one or more processors and/or hardware modules, represented by the controller or processor 2816, the modules or circuits 2804, 2806 and 2808, and the processor-readable storage medium 2818. The apparatus may be coupled to a multi-lane communication link using a physical layer circuit 2814. The physical layer circuit 2814 may operate the multi-lane serial bus 2812 to support communications in accordance with I3C protocols. The bus 2820 may also link various other circuits such as timing sources, peripherals, voltage regulators, and power management circuits, which are well known in the art, and therefore, will not be described any further.

The processor 2816 is responsible for general processing, including the execution of software, code and/or instructions stored on the processor-readable storage medium 2818. The processor-readable storage medium 2818 may include a non-transitory storage medium. The software, when executed by the processor 2816, causes the processing circuit 2802 to perform the various functions described supra for any particular apparatus. The processor-readable storage medium 2818 may be used for storing data that is manipulated by the processor 2816 when executing software. The processing circuit 2802 further includes at least one of the modules 2804, 2806 and 2808. The modules 2804, 2806 and 2808 may be software modules running in the processor 2816, resident/stored in the processor-readable storage medium 2818, one or more hardware modules coupled to the processor 2816, or some combination thereof. The modules 2804, 2806 and 2808 may include microcontroller instructions, state machine configuration parameters, or some combination thereof.

In one configuration, the apparatus 2800 includes a physical layer circuit 2814 including a first line driver coupled to a first wire of a multi-lane serial bus and a second line driver coupled to a second wire of the multi-lane serial bus 2812. The apparatus may include modules and/or circuits 2804 for generating clock signals, including a recovered clock signal derived from a received sequence of symbols, where the recovered clock signal may be used to support communication in accordance with an I3C-SDR or I3C HDR-DDR protocol. The apparatus 2800 may include modules and/or circuits 2806 that support one or more modes of communication using one or more wires of the multi-lane serial bus 2812, and modules and/or circuits 2808 that encode data in accordance with one or more I3C protocol.

In one example, the apparatus 2800 may have a first interface coupled to two primary wires of the serial bus 2812, a second interface coupled to a one or more secondary wires of the serial bus, and a controller. The controller may be configured to cause the first interface to exchange first data over the two primary wires in accordance with a first I3C protocol, and cause the second interface to exchange second data over at least one secondary wire in accordance with a second I3C protocol.

The first data may be transmitted over the two primary wires in accordance with a double data rate protocol. The second interface may be configured to encode the second data in a plurality of symbols, and transmit the plurality of symbols over the at least two secondary wires. Each symbol may include bits that represent signaling state of at least two secondary wires.

In some instances, the first interface is configured to encode the first data in a sequence of symbols. Each symbol in the sequence of symbols may include bits that represent signaling state of the two primary wires. The first interface may be configured to decode the first data from a sequence of symbols received from the two primary wires. Each symbol in the sequence of symbols may include bits that represent signaling state of the two primary wires during a symbol transmission interval. A clock recovery circuit may be configured to provide a recovered clock signal having an edge corresponding to each transition between symbol transmission intervals. The second interface may be further configured to use the recovered clock signal to receive the second data when the second data is encoded according to a double data rate protocol. The second interface may be further configured to use the recovered clock signal to transmit the second data over the at least one secondary wire in accordance with a double data rate protocol.

The second interface may be configured to exchange the second data in accordance with a double data rate protocol. The second interface may be configured to exchange the second data using at least two secondary wires. Each byte of the second data may be exchanged using the at least two secondary wires.

In various examples, a plurality of commands is transmitted on the bus, each command selecting a mode of operation for the bus and the number of additional lines used for data transmissions in each selected mode of operation. Each command may be transmitted in the first mode of operation. Each of the two or more devices may be configured to support a number of data lanes. The two or more devices may be preconfigured by a master device to operate in both the first mode of operation and the second mode of operation. In the second mode of operation, a master device may be adapted to, ascertain a number of available lines coupled to each of the two or more devices, configure each slave device to use at least some of the available lines in the second mode of operation, and dynamically adapt a protocol used in the second mode of operation to utilize a corresponding number of the available lines when communicating with each slave device. The protocol may be used in the second mode of operation is adapted to use a varying number of lines to encode symbols for transmission.

Data words may be striped across lines used to transmit data signals in the second mode of operation.

In another example, the processor-readable storage medium 2818 may include code for configuring a first interface to exchange data over two primary wires of a serial bus in accordance with a first I3C protocol, and configuring a second interface to communicate over a plurality of secondary wires of the serial bus using phase-differential signaling. The second interface may be configured to exchange second data over at least one secondary wire in accordance with a second I3C protocol.

The processor-readable storage medium 2818 may include code for transmitting the first data over the two primary wires in accordance with a double data rate protocol. The processor-readable storage medium 2818 may include code for encoding the second data in a plurality of symbols, and transmitting the plurality of symbols over the at least two secondary wires. Each symbol may include bits that represent signaling state of at least two secondary wires.

The processor-readable storage medium 2818 may include code for encoding the first data in a sequence of symbols. Each symbol in the sequence of symbols may include bits that represent signaling state of the two primary wires.

The processor-readable storage medium 2818 may include code for decoding the first data from a sequence of symbols received from the two primary wires. Each symbol in the sequence of symbols may include bits that represent signaling state of the two primary wires during a symbol transmission interval. The processor-readable storage medium 2818 may include code for providing a recovered clock signal that includes an edge corresponding to each transition between symbol transmission intervals, and using the recovered clock signal to receive the second data when the second data is encoded according to a double data rate protocol. The processor-readable storage medium 2818 may include code for providing a recovered clock signal that includes an edge corresponding to each transition between symbol transmission intervals, and using the recovered clock signal to transmit the second data over the at least one secondary wire in accordance with a double data rate protocol.

The processor-readable storage medium 2818 may include code for exchanging the second data in accordance with a double data rate protocol. The processor-readable storage medium 2818 may include code for exchanging the second data using at least two secondary wires. Each byte of the second data may be exchanged using the at least two secondary wires.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An apparatus adapted for data communication, comprising:
    a first interface coupled to two primary wires of a serial bus;
    a second interface coupled to one or more secondary wires of the serial bus; and
    a controller that is, during a transaction between two or more devices coupled to the two primary wires and to at least one secondary wire, configured to:
        cause the first interface to exchange first data of the transaction over the two primary wires in accordance with a first I3C protocol; and
        cause the second interface to exchange second data of the transaction over the at least one secondary wire in accordance with a second I3C protocol while the first data is being exchanged over the two primary wires.

2. The apparatus of claim 1, wherein the first interface is configured to:
    transmit the first data over the two primary wires in accordance with a double data rate protocol.

3. The apparatus of claim 1, wherein the second interface is configured to:
    encode the second data in a plurality of symbols, each symbol including bits that represent signaling state of at least two secondary wires during transmission of the each symbol; and
    transmit the plurality of symbols over the at least two secondary wires.

4. The apparatus of claim 1, wherein the first interface is configured to:
    encode the first data in a sequence of symbols, each symbol in the sequence of symbols including bits that represent signaling state of the two primary wires.

5. The apparatus of claim 1, wherein the first interface is configured to:
    decode the first data from a sequence of symbols received from the two primary wires, each symbol in the sequence of symbols including bits that represent signaling state of the two primary wires during a symbol transmission interval.

6. The apparatus of claim 5, further comprising:
    a clock recovery circuit configured to provide a recovered clock signal having an edge corresponding to each transition between symbol transmission intervals,
    wherein the second interface is configured to:
        use the recovered clock signal to receive the second data when the second data is encoded according to a double data rate protocol.

7. The apparatus of claim 5, further comprising:
    a clock recovery circuit configured to provide a recovered clock signal having an edge corresponding to each transition between symbol transmission intervals,
    wherein the second interface is configured to:
        use the recovered clock signal to transmit the second data over the at least one secondary wire in accordance with a double data rate protocol.

8. The apparatus of claim 1, wherein the second interface is configured to:
    exchange the second data in accordance with a double data rate protocol.

9. The apparatus of claim 8, wherein the second interface is further configured to:
    exchange the second data using at least two secondary wires.

10. The apparatus of claim 9, wherein each byte of the second data is exchanged using the at least two secondary wires.

11. A method of data communication, comprising:
    configuring a first interface to exchange first data over two primary wires of a serial bus in accordance with a first I3C protocol, wherein the first data is exchanged over the two primary wires during a transaction between two or more devices; and
    configuring a second interface to exchange second data over at least one secondary wire in accordance with a second I3C protocol, wherein the second data is exchanged over the at least one secondary wire while the first data is being exchanged over the two primary wires during the transaction between the two or more devices,
    wherein the two or more devices are coupled to the two primary wires and to the at least one secondary wire.

12. The method of claim 11, further comprising:
    transmitting the first data over the two primary wires in accordance with a double data rate protocol.

13. The method of claim 11, further comprising:
    encoding the second data in a plurality of symbols, each symbol including bits that represent signaling state of at least two secondary wires during transmission of the each symbol; and
    transmitting the plurality of symbols over the at least two secondary wires.

14. The method of claim 11, further comprising:
    encoding the first data in a sequence of symbols, each symbol in the sequence of symbols including bits that represent signaling state of the two primary wires.

15. The method of claim 11, further comprising:
    decoding the first data from a sequence of symbols received from the two primary wires, each symbol in the sequence of symbols including bits that represent signaling state of the two primary wires during a symbol transmission interval.

16. The method of claim 15, further comprising:
    providing a recovered clock signal that includes an edge corresponding to each transition between symbol transmission intervals; and
    using the recovered clock signal to receive the second data when the second data is encoded according to a double data rate protocol.

17. The method of claim 15, further comprising:
    providing a recovered clock signal that includes an edge corresponding to each transition between symbol transmission intervals; and
    using the recovered clock signal to transmit the second data over the at least one secondary wire in accordance with a double data rate protocol.

18. The method of claim 11, further comprising:
exchanging the second data in accordance with a double data rate protocol.

19. The method of claim 18, further comprising:
exchanging the second data using at least two secondary wires.

20. The method of claim 19, wherein each byte of the second data is exchanged using the at least two secondary wires.

21. A non-transitory storage medium, comprising code for:
configuring a first interface to exchange first data over two primary wires of a serial bus in accordance with a first I3C protocol, wherein the first data is exchanged over the two primary wires during a transaction between two or more devices; and
configuring a second interface to exchange second data over at least one secondary wire in accordance with a second I3C protocol, wherein the second data is exchanged over the at least one secondary wire while the first data is being exchanged over the two primary wires during the transaction between the two or more devices,
wherein the two or more devices are coupled to the two primary wires and to the at least one secondary wire.

22. The storage medium of claim 21, further comprising code for:
transmitting the first data over the two primary wires in accordance with a double data rate protocol.

23. The storage medium of claim 21, further comprising code for:
encoding the second data in a plurality of symbols, each symbol including bits that represent signaling state of at least two secondary wires during transmission of the each symbol; and
transmitting the plurality of symbols over the at least two secondary wires.

24. The storage medium of claim 21, further comprising code for:
encoding the first data in a sequence of symbols, each symbol in the sequence of symbols including bits that represent signaling state of the two primary wires.

25. The storage medium of claim 21, further comprising code for:
decoding the first data from a sequence of symbols received from the two primary wires, each symbol in the sequence of symbols including bits that represent signaling state of the two primary wires during a symbol transmission interval.

26. The storage medium of claim 25, further comprising code for:
providing a recovered clock signal that includes an edge corresponding to each transition between symbol transmission intervals; and
using the recovered clock signal to receive the second data when the second data is encoded according to a double data rate protocol.

27. The storage medium of claim 25, further comprising code for:
providing a recovered clock signal that includes an edge corresponding to each transition between symbol transmission intervals; and
using the recovered clock signal to transmit the second data over the at least one secondary wire in accordance with a double data rate protocol.

28. The storage medium of claim 21, further comprising code for:
exchanging the second data in accordance with a double data rate protocol.

29. The storage medium of claim 28, further comprising code for:
exchanging the second data using at least two secondary wires.

30. The storage medium of claim 29, wherein each byte of the second data is exchanged using the at least two secondary wires.

* * * * *